United States Patent
Hariyama et al.

(10) Patent No.: US 11,421,976 B2
(45) Date of Patent: *Aug. 23, 2022

(54) SHAPE MEASUREMENT SYSTEM, PROBE TIP UNIT, AND SHAPE MEASUREMENT METHOD

(71) Applicant: HITACHI, LTD., Tokyo (JP)

(72) Inventors: Tatsuo Hariyama, Tokyo (JP); Masahiro Watanabe, Tokyo (JP); Atsushi Taniguchi, Tokyo (JP); Kenji Maruno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/338,207

(22) Filed: Jun. 3, 2021

(65) Prior Publication Data

US 2021/0293524 A1    Sep. 23, 2021

Related U.S. Application Data

(63) Continuation of application No. 16/694,390, filed on Nov. 25, 2019, now Pat. No. 11,054,242.

(30) Foreign Application Priority Data

Nov. 28, 2018 (JP) .............................. JP2018-222227

(51) Int. Cl.
*G01B 9/02* (2022.01)
*G01B 9/02015* (2022.01)

(52) U.S. Cl.
CPC ......... *G01B 9/0205* (2013.01); *G01B 9/0203* (2013.01)

(58) Field of Classification Search
CPC ...... G01B 9/0205; G01B 11/12; G01B 11/24; G01B 11/2441; G01B 21/047
See application file for complete search history.

(56) References Cited

U.S. PATENT DOCUMENTS

| 5,127,734 A | 7/1992 | Ohi et al. |
| 5,396,712 A * | 3/1995 | Herzog ................. G01B 5/008 33/502 |

(Continued)

FOREIGN PATENT DOCUMENTS

| JP | 2003-028791 A | 1/2003 |
| JP | 2007-271601 A | 10/2007 |
| JP | 2013-246173 A | 12/2013 |

OTHER PUBLICATIONS

Japanese Office Action dated Jun. 7, 2022 for Japanese Patent Application No. 2018-222227.

*Primary Examiner* — Michael A Lyons
(74) *Attorney, Agent, or Firm* — Volpe Koenig

(57) ABSTRACT

Provided is a shape measurement system in order to perform three-dimensional measurement corresponding to a measurement object having various shapes, which includes a measurement probe, a probe tip, and a processor. The probe tip includes an optical element that is configured to irradiate an object with measurement light and a cylindrical unit that is configured to lock the optical element. The processor is configured to calculate an optical path length from the optical element to an object based on reflected light of the measurement light with which the object is irradiated; and calculate a three-dimensional shape of the object based on the input information and the optical path length.

5 Claims, 35 Drawing Sheets

(56) References Cited

U.S. PATENT DOCUMENTS

| | | |
|---|---|---|
| 5,895,927 A | 4/1999 | Brown |
| 11,054,242 B2 * | 7/2021 | Hariyama ............ G01B 9/0205 |
| 2004/0061865 A1 * | 4/2004 | Drabarek ........... G01B 9/02057 |
| | | 356/496 |
| 2004/0085543 A1 | 5/2004 | Xie et al. |
| 2004/0181148 A1 | 9/2004 | Uchiyama et al. |
| 2008/0117431 A1 | 5/2008 | Teramura |
| 2016/0131473 A1 | 5/2016 | Kasai et al. |
| 2019/0107379 A1 | 4/2019 | Singh et al. |
| 2020/0018823 A1 | 1/2020 | Maruno et al. |
| 2020/0041259 A1 | 2/2020 | Watanabe et al. |

* cited by examiner

[FIG. 1]
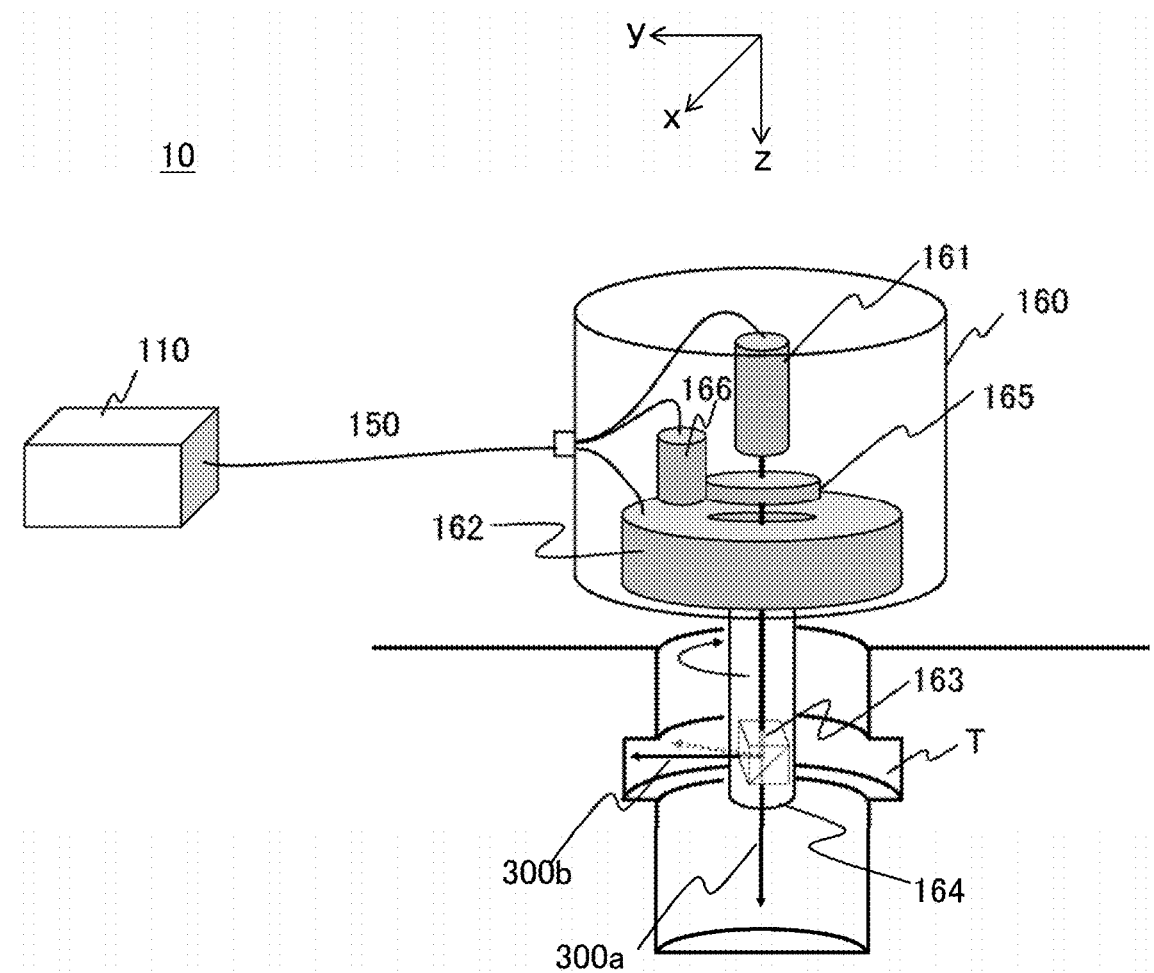

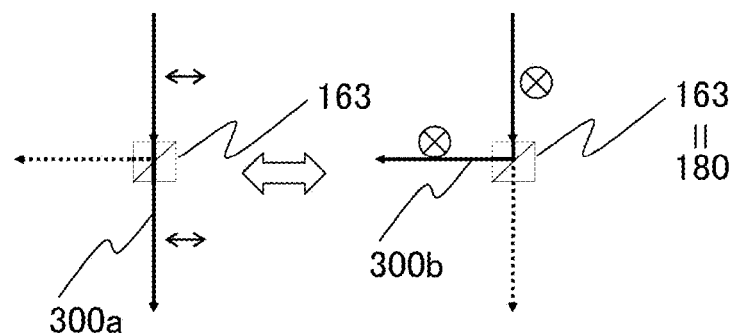
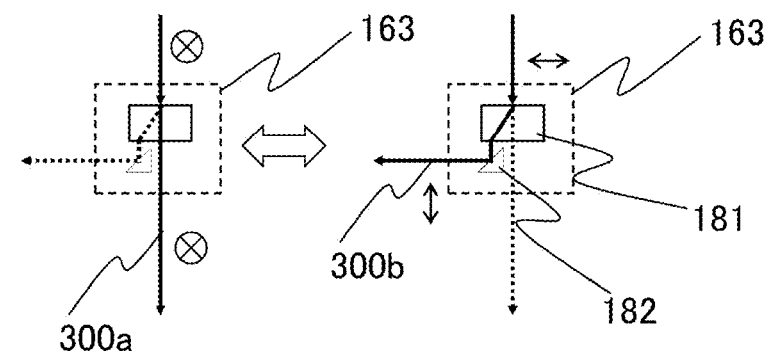

[FIG. 5]
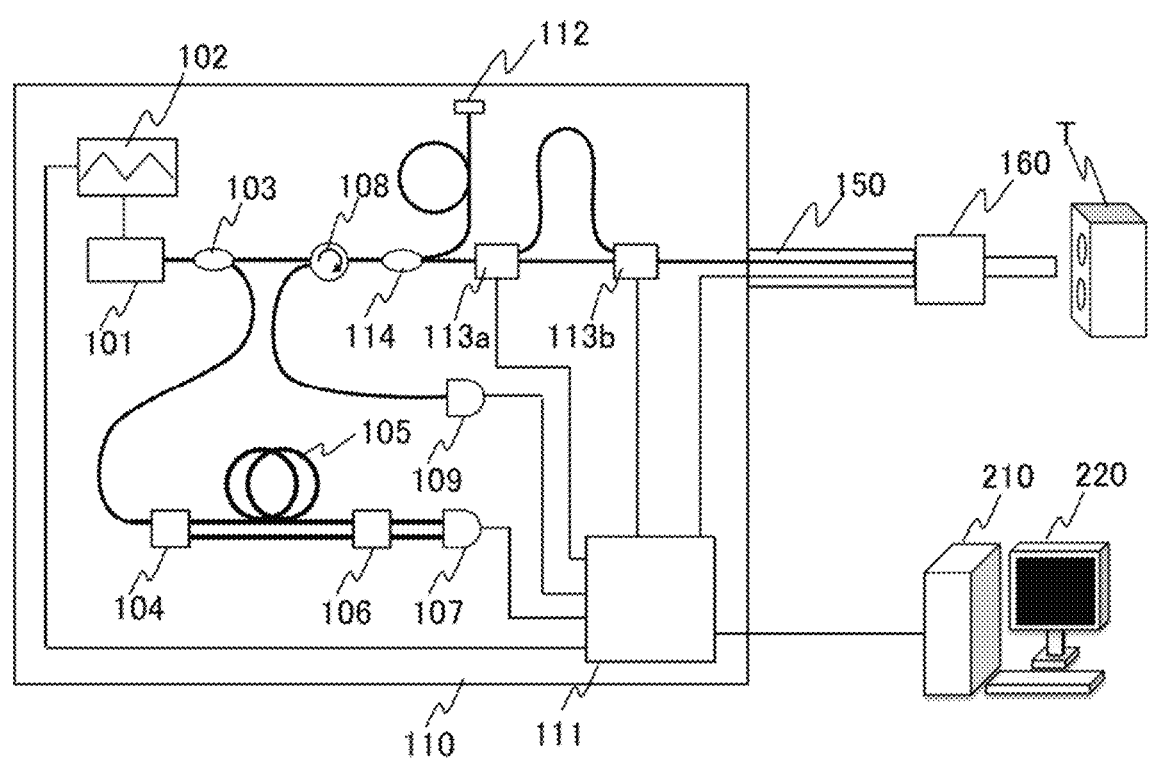

[FIG. 6]
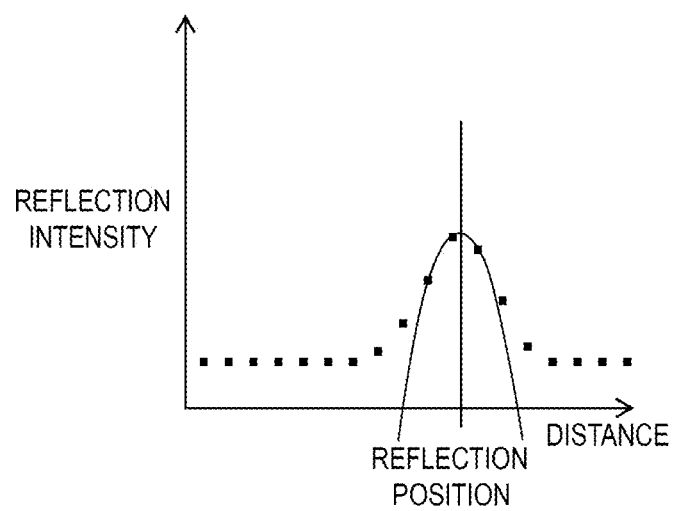

[FIG. 7]
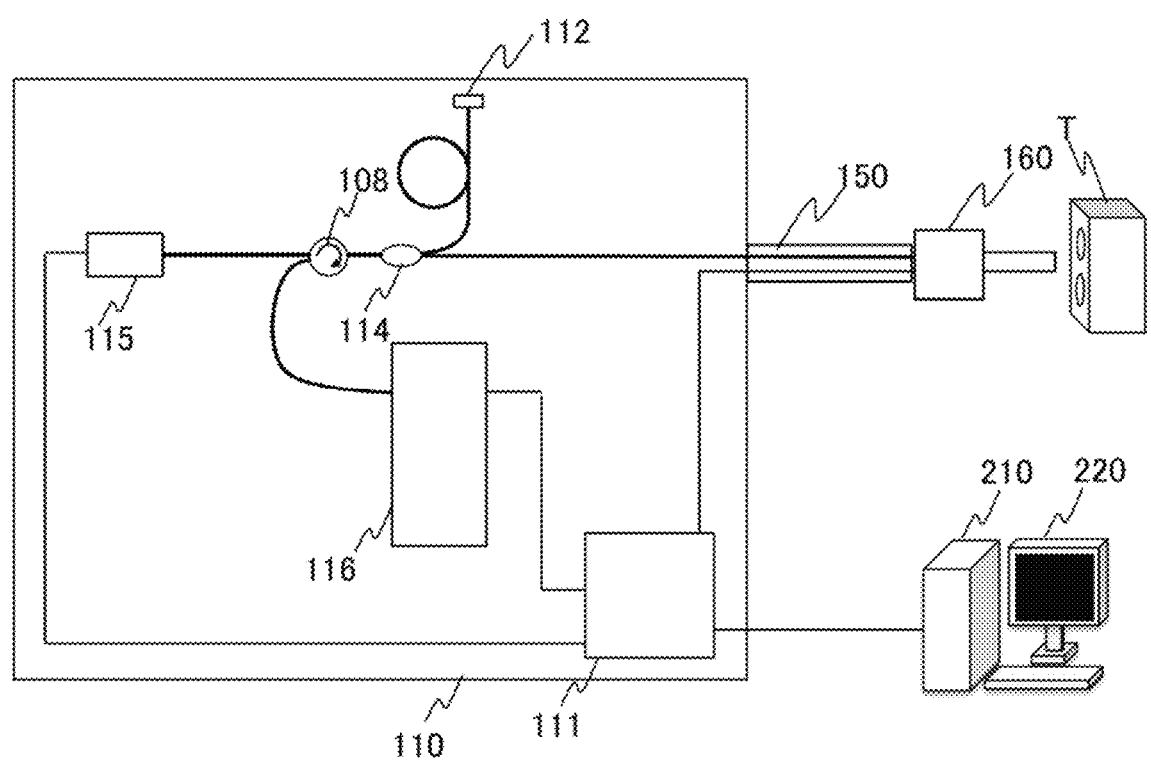

[FIG. 8]
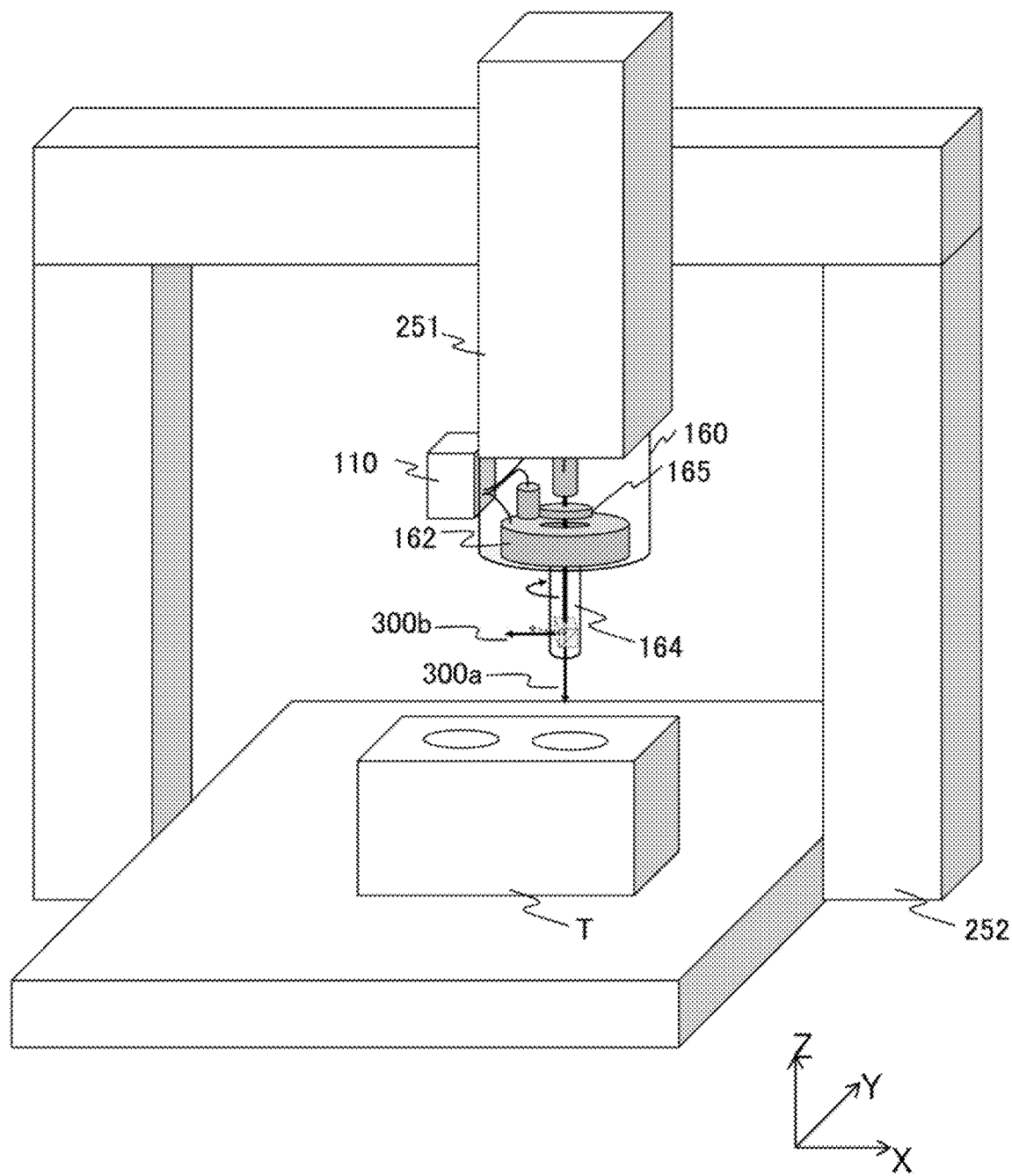

[FIG. 9]
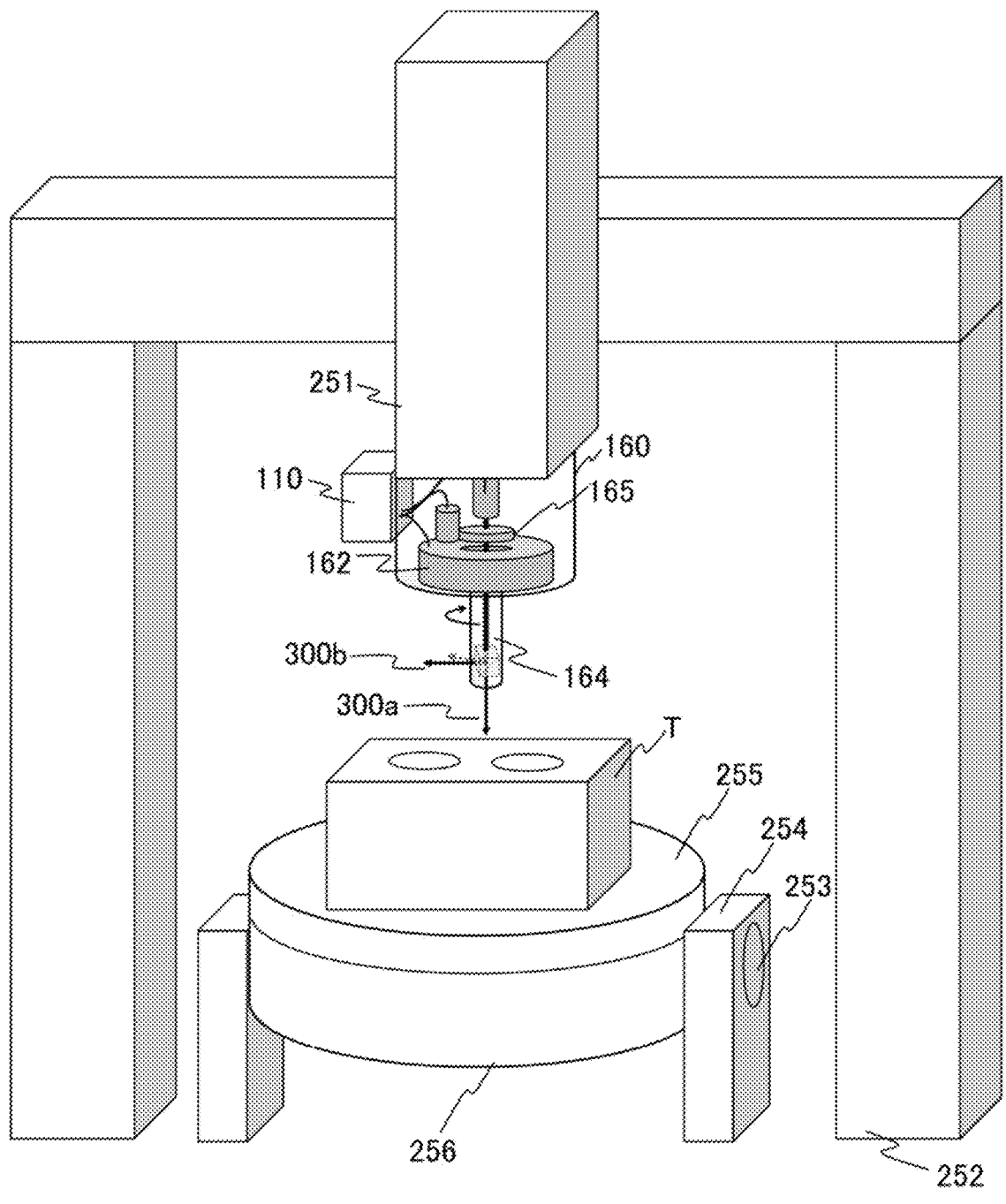

[FIG. 10]
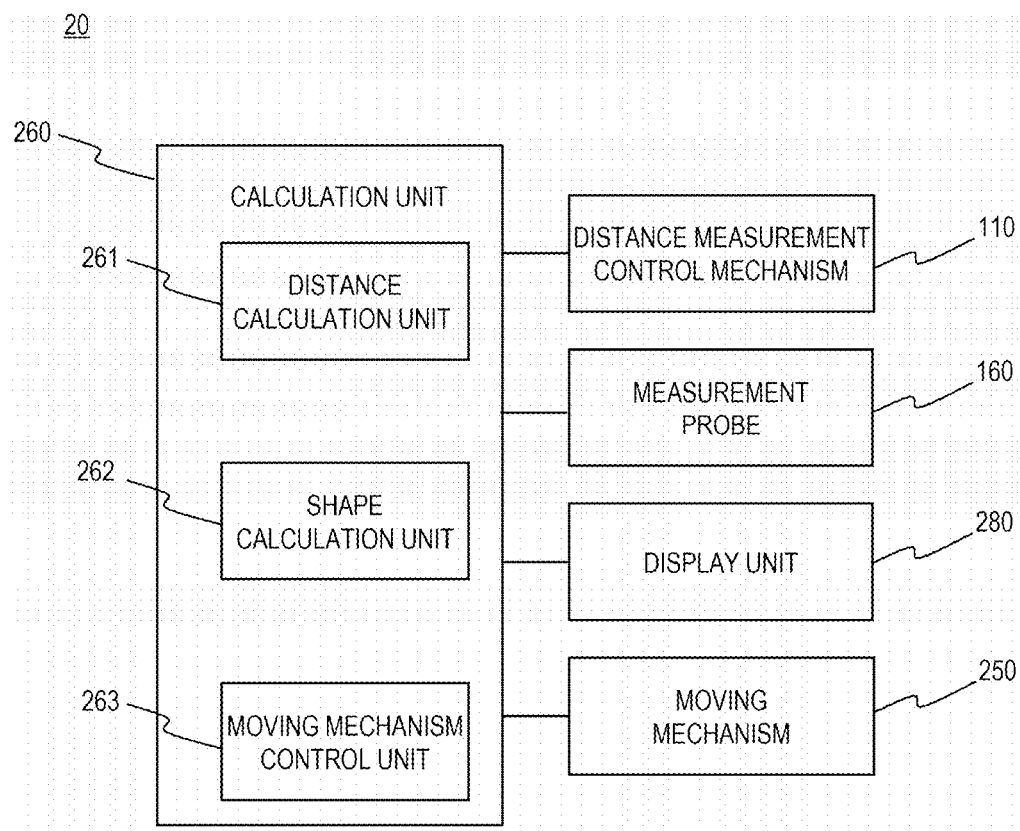

[FIG. 11]
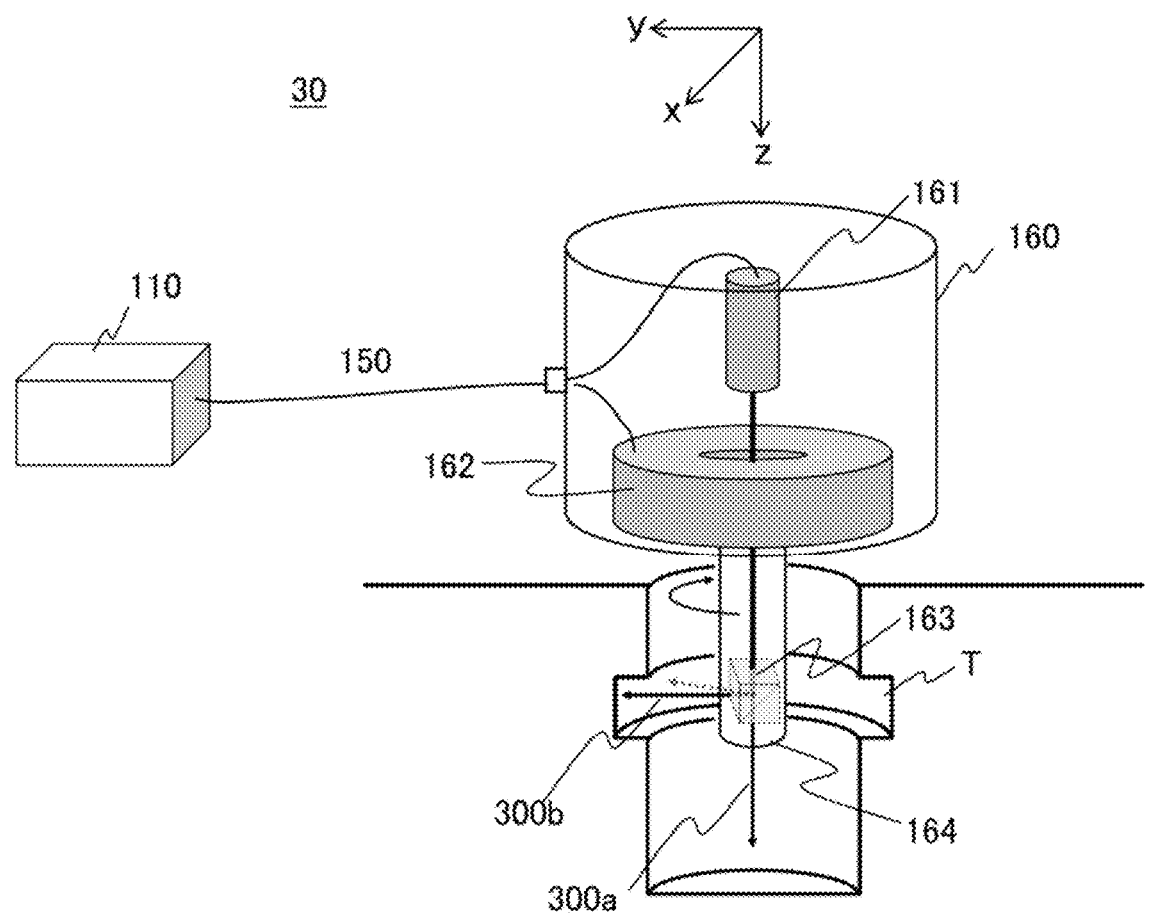

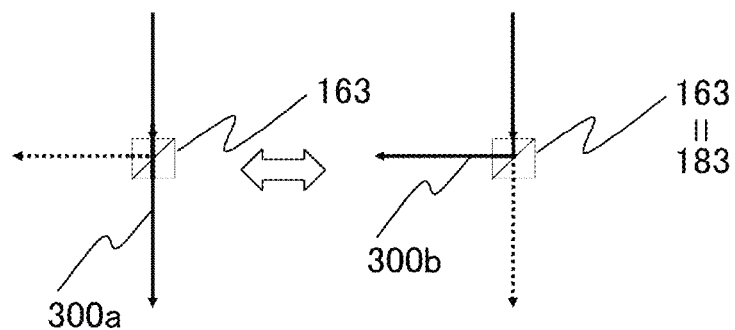

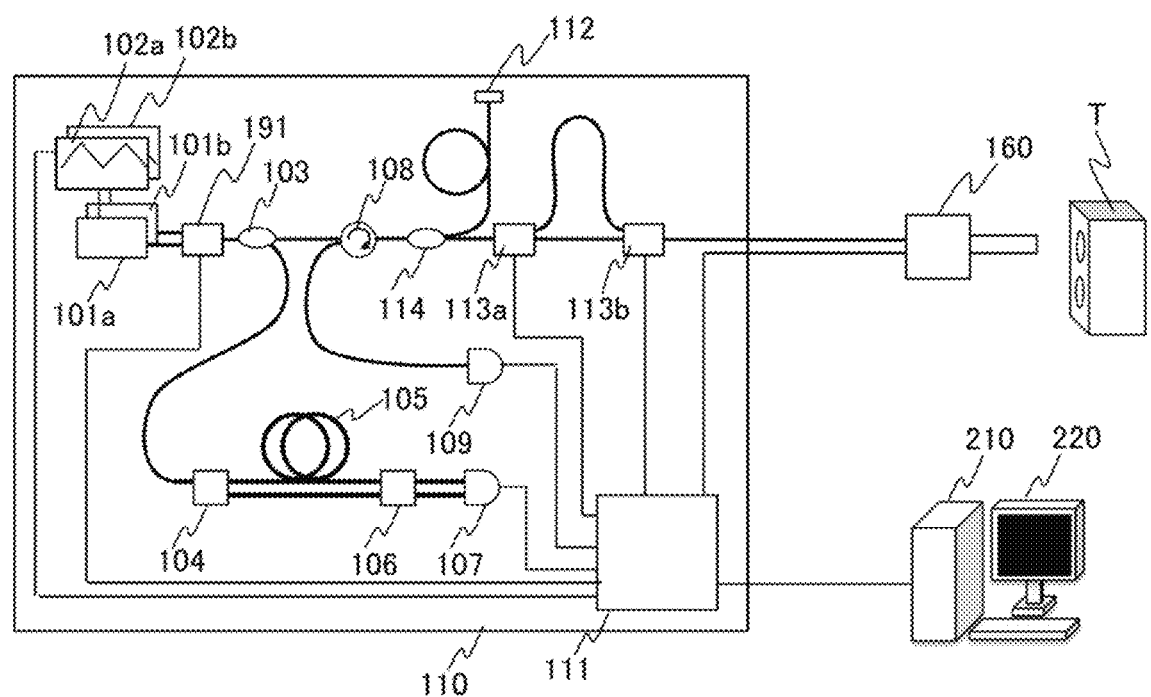
[FIG. 13]

[FIG. 14]
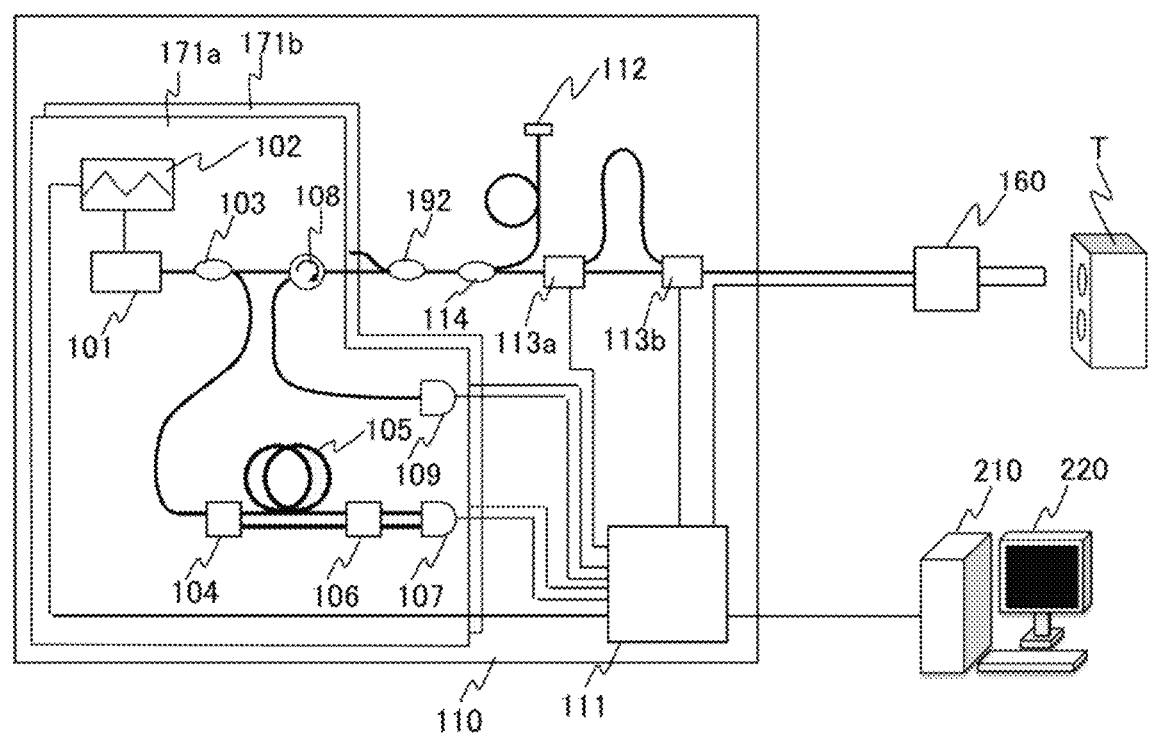

[FIG. 15]
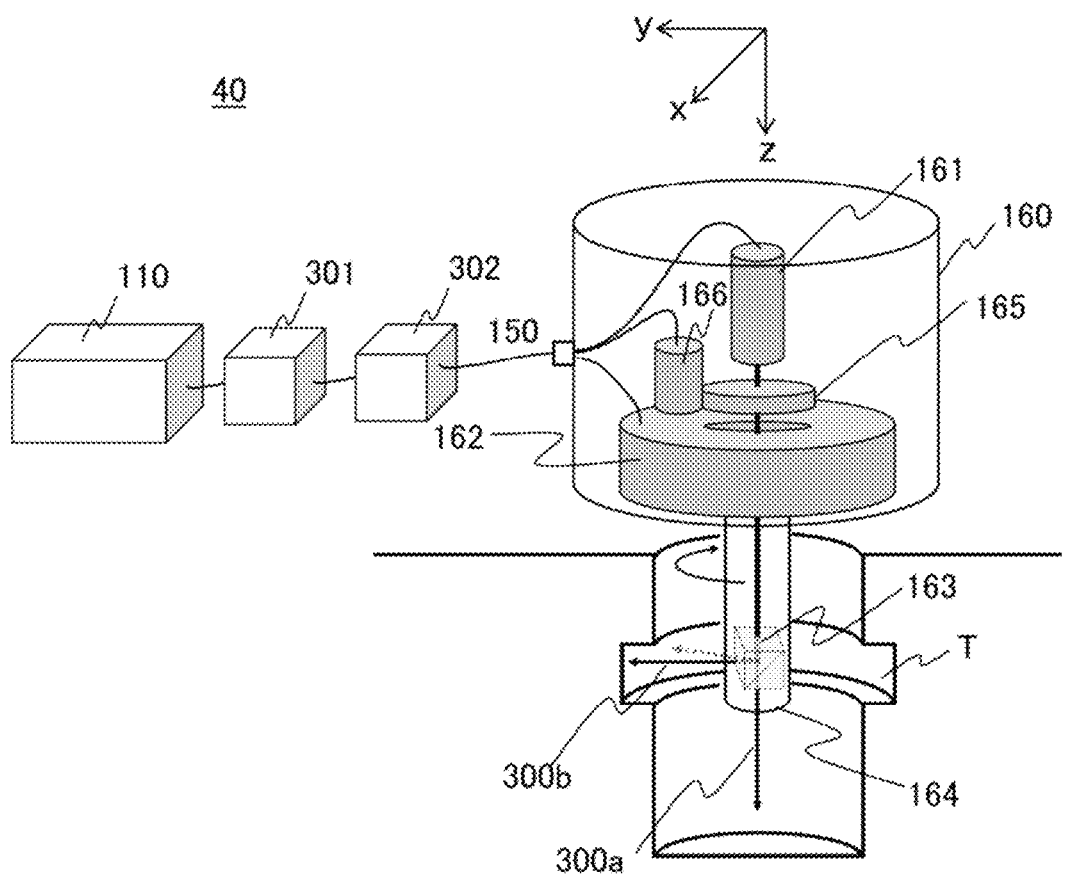

[FIG. 17]
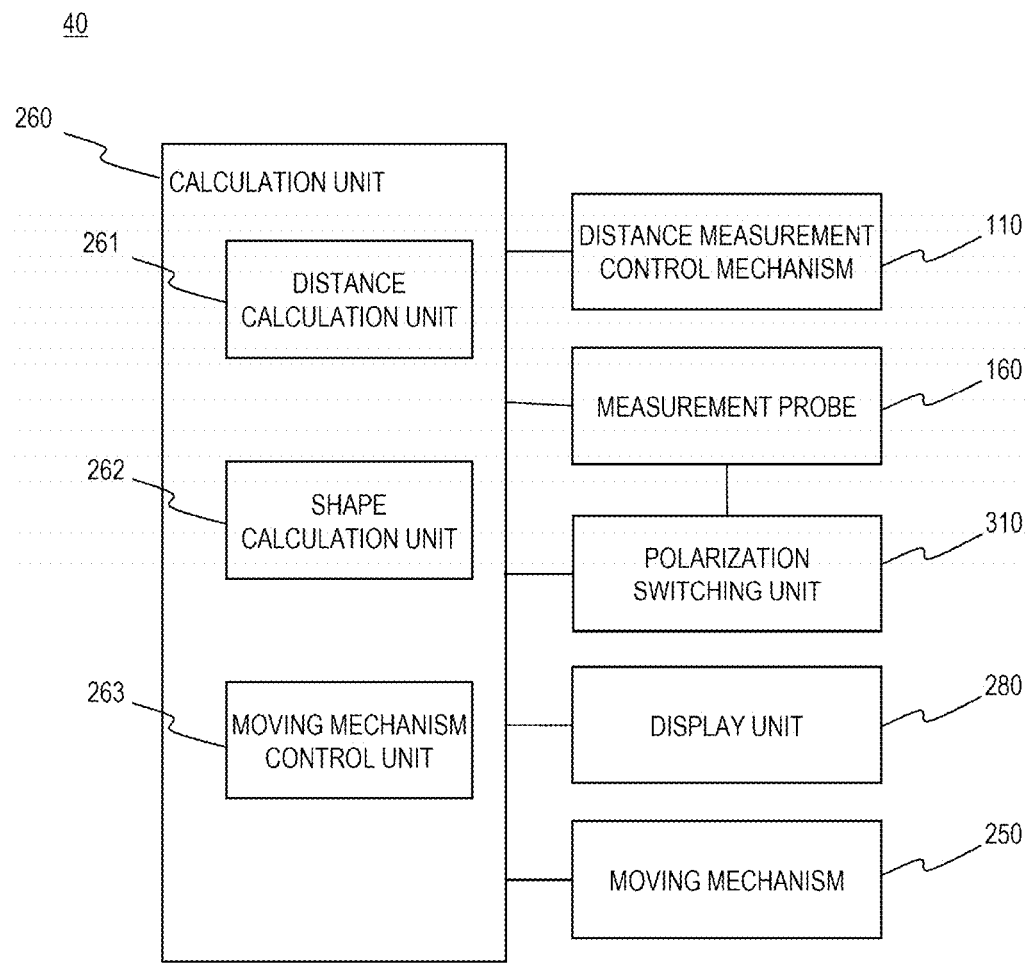

[FIG. 19]
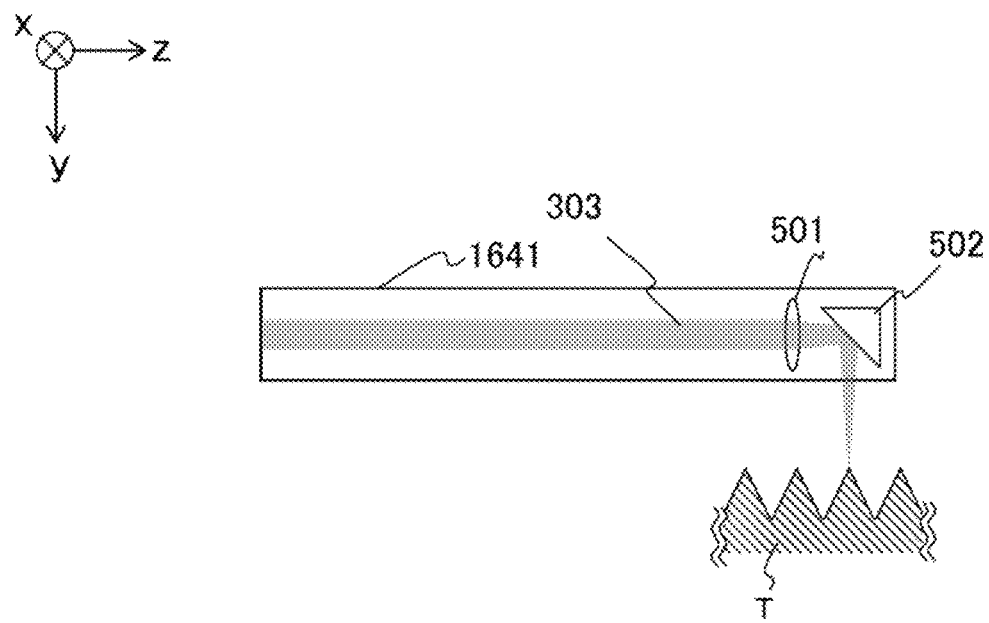

[FIG. 20]
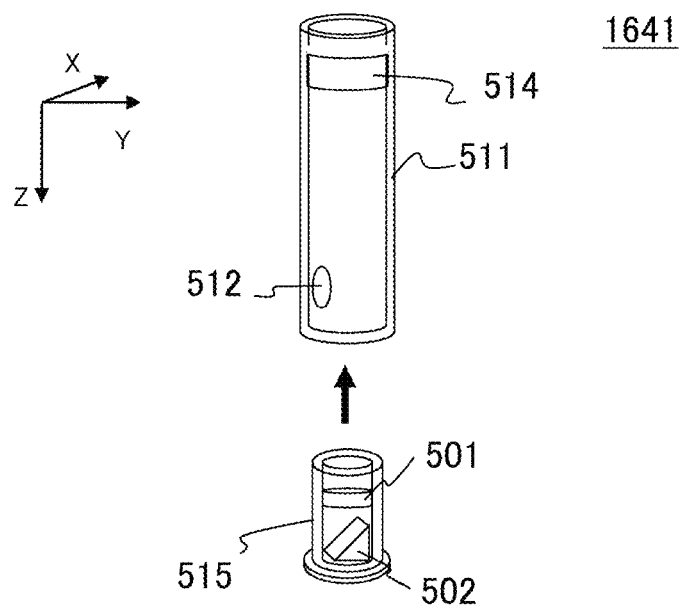

[FIG. 23]
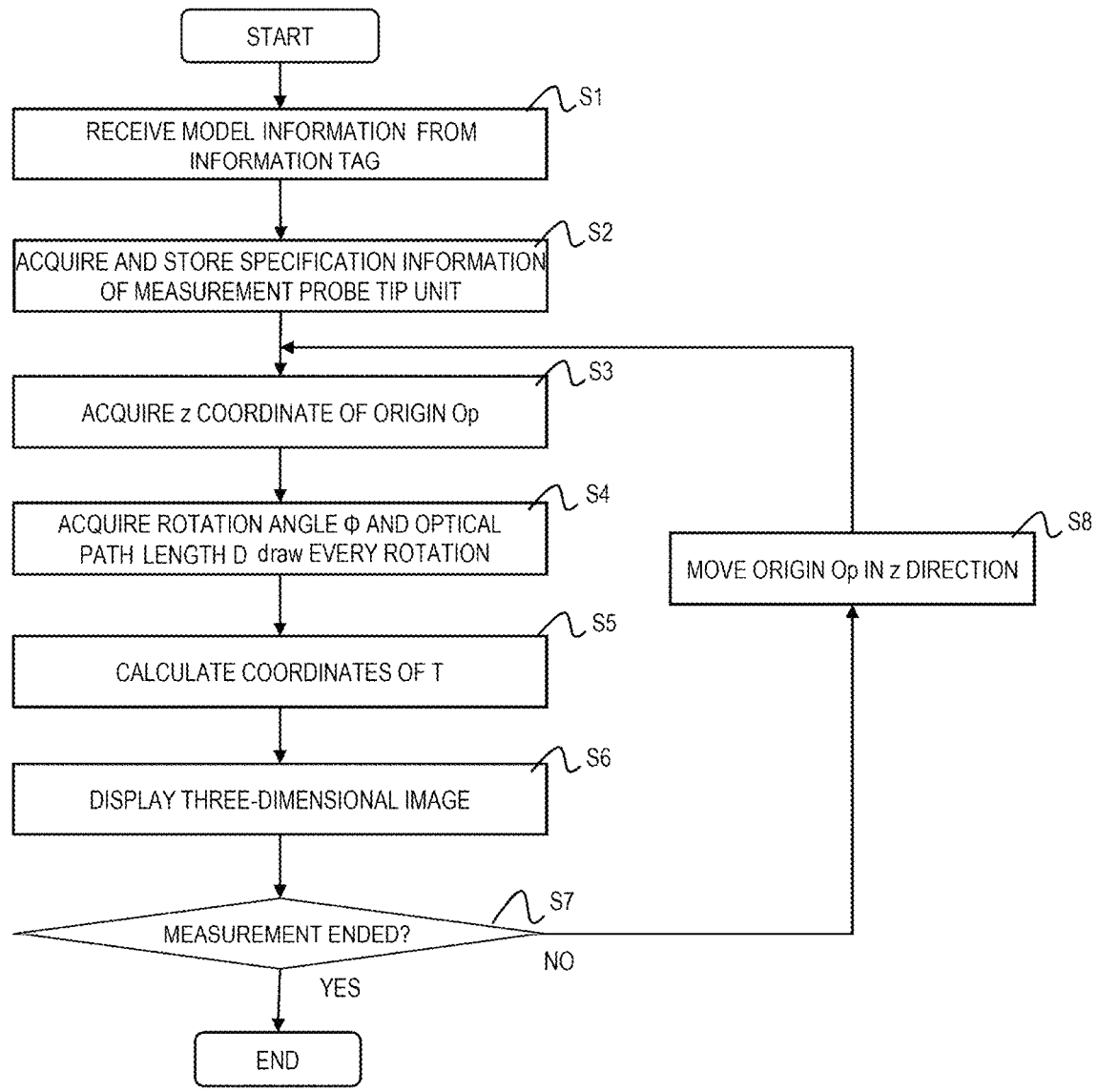

[FIG. 24]
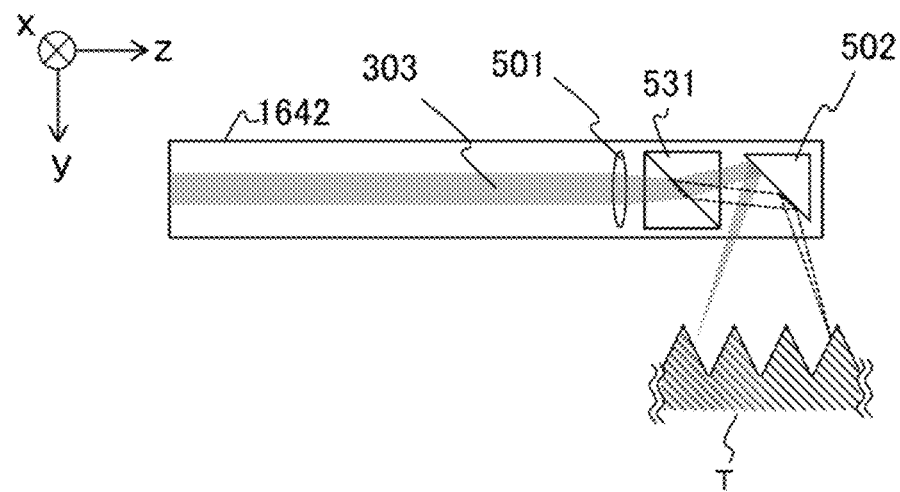

[FIG. 26]
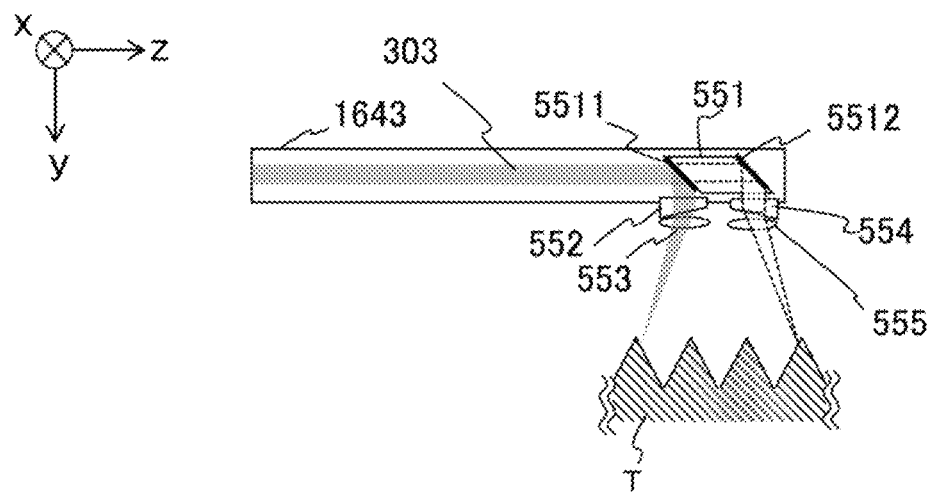

[FIG. 27]
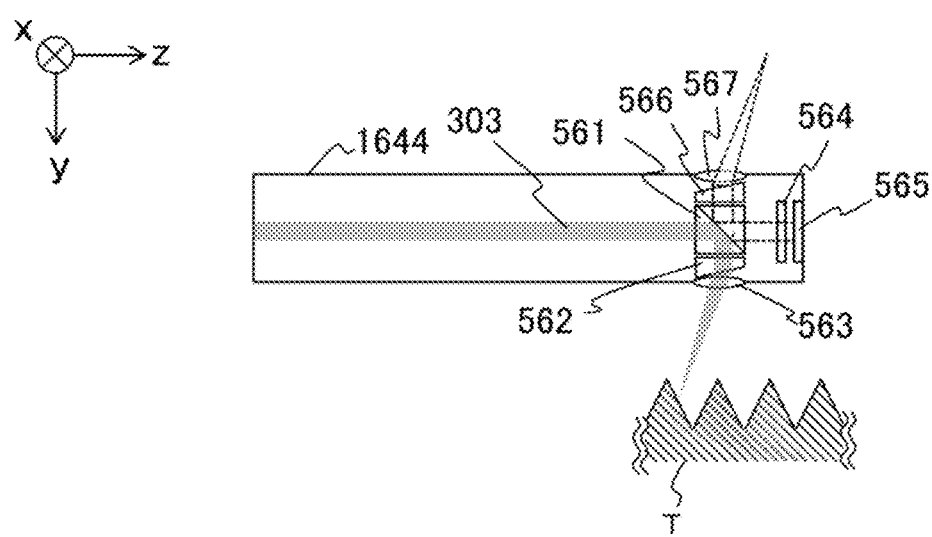

[FIG. 28]
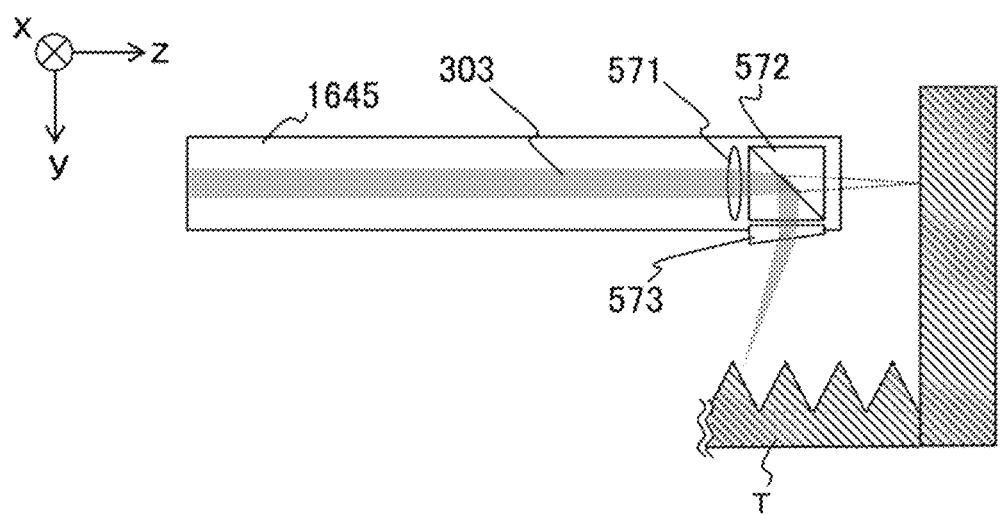

[FIG. 29]
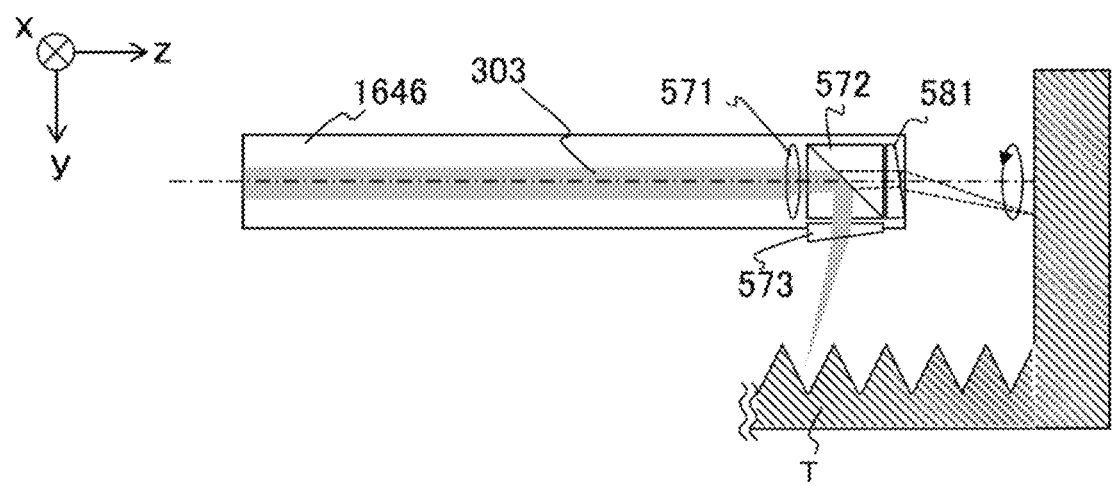

[FIG. 30]
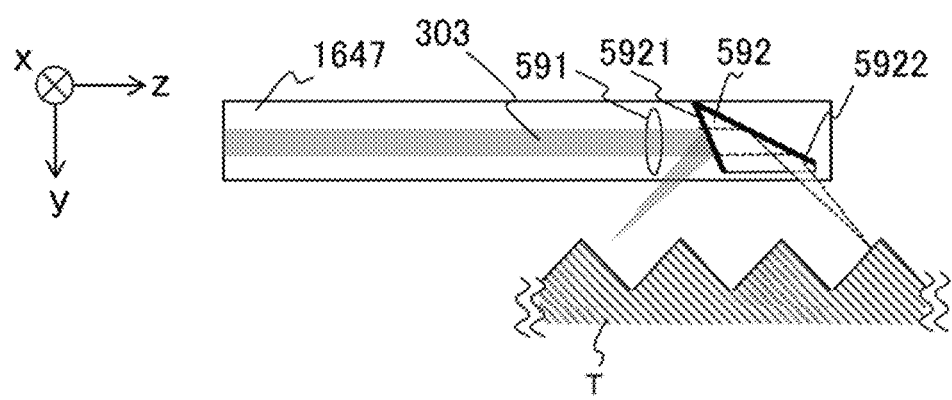

[FIG. 31]
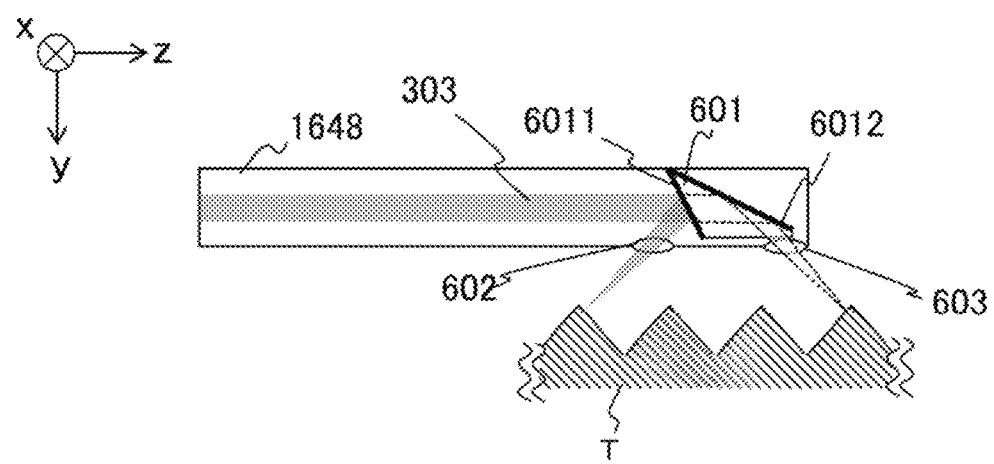

[FIG. 32]
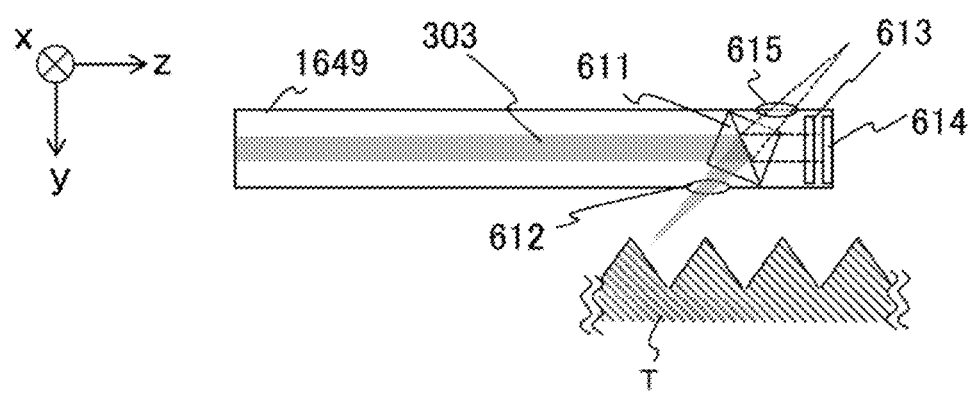

[FIG. 33]
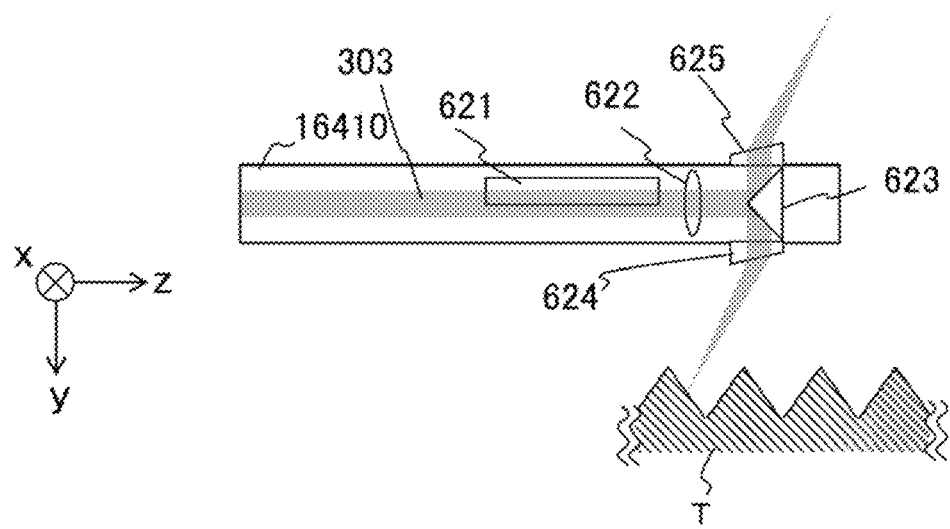

[FIG. 34]
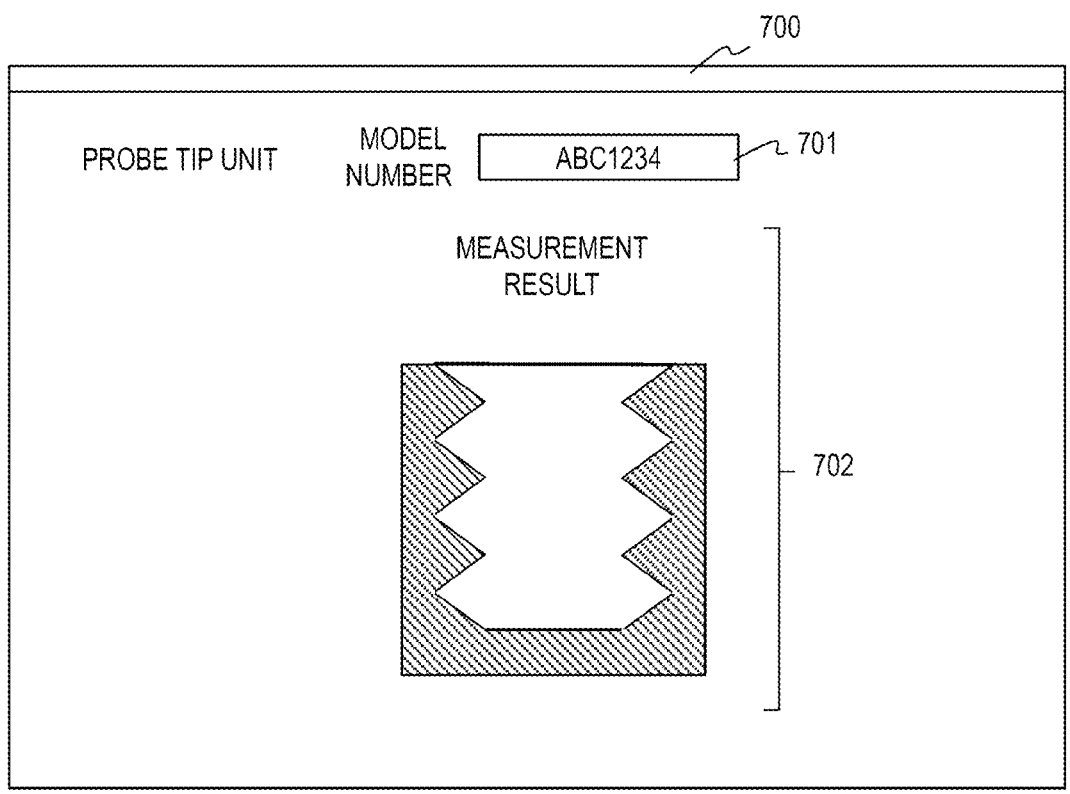

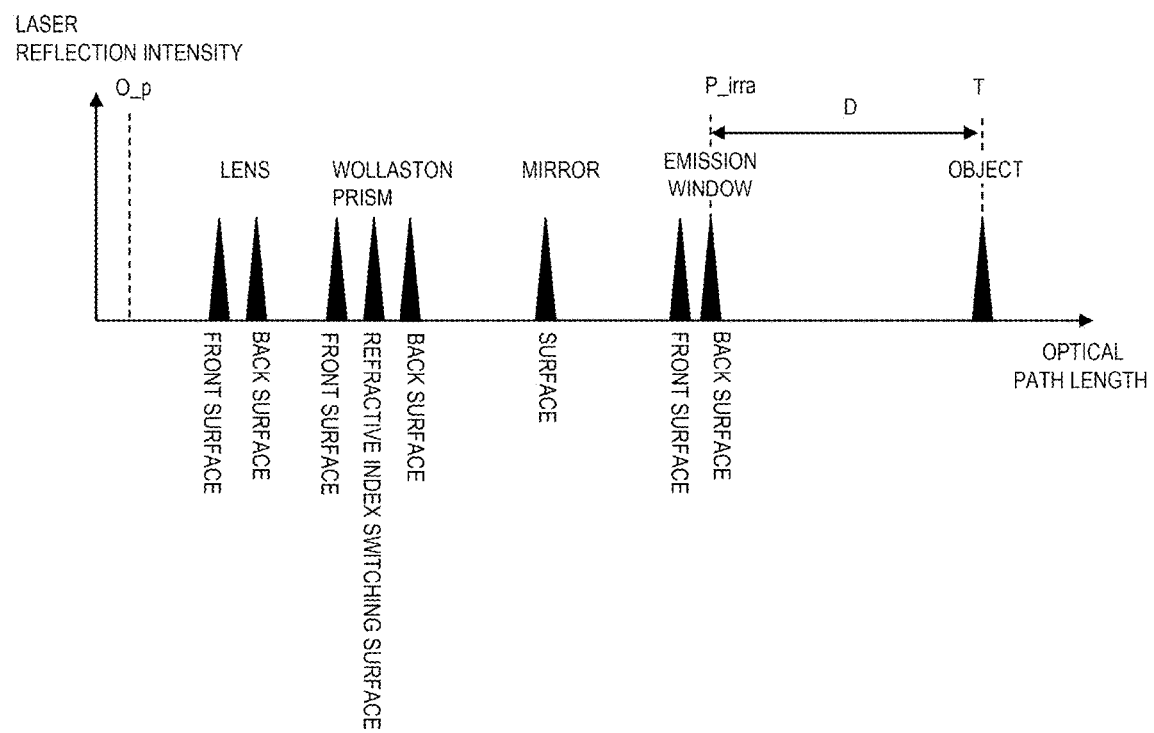
[FIG. 35]

SHAPE MEASUREMENT SYSTEM, PROBE TIP UNIT, AND SHAPE MEASUREMENT METHOD

CROSS REFERENCE TO RELATED APPLICATION

This application is a Continuation Application of U.S. patent application Ser. No. 16/694,390, filed Nov. 25, 2019 which claims the benefit of Japanese Patent Application No. 2018-222227, filed Nov. 28, 2018, which are incorporated herein by reference.

TECHNICAL FIELD

The present invention relates to a shape measurement system, a probe tip unit, and a shape measurement method.

BACKGROUND ART

PTL 1 discloses a technology related to an optical measurement instrument. Specifically, for example, in paragraph 0064, "There is an example in which measurement light is deflected in a direction other than the direction of the main axis 19 of the processing machine by reflecting the measurement light, and measurement such as three-dimensional shape measurement of the standing wall (or side wall) and the hole inner surface of the measurement object 4 is performed. Further, as for the shape of the hole inner surface, three-dimensional measurement is performed on the circumferential unevenness of the hole like a screw thread of a nut, a spline hole having a groove in the axial direction of the hole inner surface, and a key groove. In the case of deep groove measurement, the measurement is performed by selecting one of the methods shown in FIGS. 12 and 13 according to the direction in which the groove is formed." is disclosed.

RELATED ART LITERATURE

Patent Literature

PTL 1: JP-A-2007-271601

SUMMARY OF INVENTION

Technical Problem

As described above, there is a device that performs three-dimensional measurement of the measurement object by reflecting the measurement light in the direction other than the main axis direction of the processing machine in the related art. However, in the device in the related art, since the length of a probe tip unit to be inserted into a hole or groove of the measurement object is fixed and a focus position of the measurement light is fixed, there is a limit to the depth of the hole and the distance to the wall surface that can be actually measured.

Further, since an irradiation angle of the measurement light emitted onto the measurement object from the probe tip unit is fixed, for example, when the wall surface of the measurement object is inclined like a screw hole, the measurement accuracy may decrease since the reflected light from the measurement object tends to be reflected in a direction different from that during irradiation.

The invention has been made in view of such circumstances, and an object thereof is to provide a technology capable of measuring a three-dimensional shape of a measurement object having various shapes.

Solution to Problem

The present application includes a plurality of means for solving at least a part of the problems described above, and examples thereof are as follows.

In order to solve the above problems, a shape measurement system according to an aspect of the invention is a shape measurement system including a measurement probe, a probe tip unit, and a calculation unit. The measurement probe includes a motor that is configured to rotates the probe tip unit that is fixed, a light source that is configured to irradiate an optical element to which the probe tip unit is locked with measurement light, and a probe control unit that is configured to calculate an optical path length from the probe tip unit to an object based on reflected light of the measurement light with which the object is irradiated. The probe tip unit includes an optical element that is configured to irradiate the object with the measurement light, a fixing mechanism that is configured to fix to the measurement probe so as to be detachable and replaceable, and a cylindrical unit that is configured to lock the optical element and is provided with the fixing mechanism. The calculation unit is configured to receive model number information or specification information of the probe tip unit as input information, receive the optical path length from the probe control unit, and calculate a three-dimensional shape of the object based on the input information and the optical path length.

Advantageous Effect

According to the aspect of the invention, it is possible to perform three-dimensional measurement corresponding to the measurement object having various shapes.

Problems, configurations, and effects other than those described above are apparent from the following description of the embodiments.

BRIEF DESCRIPTION OF DRAWINGS

FIG. 1 is a schematic diagram showing an example of a shape measurement system according to a first embodiment.

FIGS. 2A-2D show diagrams illustrating operation of an optical path switching element, in which FIG. 2A is a diagram showing a state where measurement light is polarized in a left-right direction of the figure with respect to a polarization beam splitter, FIG. 2B is a diagram showing a state where the measurement light is polarized in a depth direction of the figure with respect to the polarization beam splitter, FIG. 2C is a diagram showing a state where the measurement light is polarized in the depth direction of the figure with respect to a birefringent plate and a mirror, and FIG. 2D is a diagram showing a state where the measurement light is polarized in the left-right direction of the figure with respect to the birefringent plate and the mirror.

FIGS. 3A and 3B show diagrams showing a relationship between absolute angles of optical elements in the first embodiment, in which FIG. 3A shows a case where light travels in a first direction, and FIG. 3B shows a case where the light travels in a second direction.

FIGS. 4A and 4B show diagrams showing a relationship between relative angles of the optical elements in the first embodiment, in which FIG. 4A shows a case where the light travels in the first direction, and FIG. 4B shows a case where the light travels in the second direction.

FIG. 5 is a diagram showing an example of a configuration of a distance measurement control mechanism in the first embodiment.

FIG. 6 is a diagram showing an example of a method of obtaining a reflection position on an object surface based on a reflection intensity profile.

FIG. 7 is a diagram showing another example of the configuration of the distance measurement control mechanism in the first embodiment.

FIG. 8 is a schematic diagram showing an example of the shape measurement system.

FIG. 9 is a schematic diagram showing another example of the shape measurement system.

FIG. 10 is a diagram showing an example of a functional block of the shape measurement system.

FIG. 11 is a schematic diagram showing an example of a shape measurement system according to a second embodiment.

FIGS. 12A and 12B show diagrams illustrating the operation of the optical path switching element, in which FIG. 12A is a diagram showing a state where the measurement light is polarized in the left-right direction of the figure with respect to a dichroic mirror, and FIG. 12B is a diagram showing a state where the measurement light is polarized in the depth direction of the figure with respect to the dichroic mirror.

FIG. 13 is a diagram showing an example of a configuration of a distance measurement control mechanism in the second embodiment.

FIG. 14 is a diagram showing another example of the configuration of the distance measurement control mechanism in the second embodiment.

FIG. 15 is a schematic diagram showing an example of a shape measurement system according to a third embodiment.

FIGS. 16A and 16B show diagrams showing a relationship between relative angles of the optical elements in the third embodiment, in which FIG. 16A shows a case where the light travels in the first direction, and FIG. 16B shows a case where the light travels in the second direction.

FIG. 17 is a diagram showing an example of a functional block of the shape measurement system according to the third embodiment.

FIGS. 18A and 18B show diagrams showing examples of a configuration of a probe tip unit according to a fourth embodiment, in which FIG. 18A is a diagram showing a case where one condensing lens system is provided, and FIG. 18B is a diagram showing a case where two condensing lens systems are provided.

FIG. 19 is a diagram showing a first configuration example of a detachable and replaceable probe tip unit.

FIG. 20 is a diagram showing a detailed configuration example of the detachable and replaceable probe tip unit.

FIGS. 21A and 21B show diagrams showing examples of a mechanism for mounting the probe tip unit to a measurement probe, in which FIG. 21A shows a case where the probe tip unit is mounted to the measurement probe from the side, and FIG. 21B shows a case where the probe tip unit is mounted to the measurement probe from below.

FIGS. 22A and 22B show diagrams illustrating a method of calculating a coordinate (x, y, z) of an object T corresponding to the first configuration example of the detachable and replaceable probe tip unit, in which FIG. 22A is a yz cross-sectional view of the probe tip unit, and FIG. 22B is an xy cross-sectional view of the probe tip unit.

FIG. 23 is a flowchart illustrating a three-dimensional shape measurement processing.

FIG. 24 is a diagram showing a second configuration example of the detachable and replaceable probe tip unit.

FIGS. 25A and 25B show diagrams illustrating a method of calculating a coordinate (x, y, z) of an object T corresponding to the second configuration example of the detachable and replaceable probe tip unit, in which FIG. 25A is a yz cross-sectional view of the probe tip unit, and FIG. 25B is an xy cross-sectional view of the probe tip unit.

FIG. 26 is a diagram showing a third configuration example of the detachable and replaceable probe tip unit.

FIG. 27 is a diagram showing a fourth configuration example of the detachable and replaceable probe tip unit.

FIG. 28 is a diagram showing a fifth configuration example of the detachable and replaceable probe tip unit.

FIG. 29 is a diagram showing a sixth configuration example of the detachable and replaceable probe tip unit.

FIG. 30 is a diagram showing a seventh configuration example of the detachable and replaceable probe tip unit.

FIG. 31 is a diagram showing an eighth configuration example of the detachable and replaceable probe tip unit.

FIG. 32 is a diagram showing a ninth configuration example of the detachable and replaceable probe tip unit.

FIG. 33 is a diagram showing a tenth configuration example of the detachable and replaceable probe tip unit.

FIG. 34 is a diagram showing a display example of an output screen.

FIG. 35 is a diagram showing an example of an optical path length of each optical element of the probe tip unit.

DESCRIPTION OF EMBODIMENTS

First Embodiment

Figure 3A:
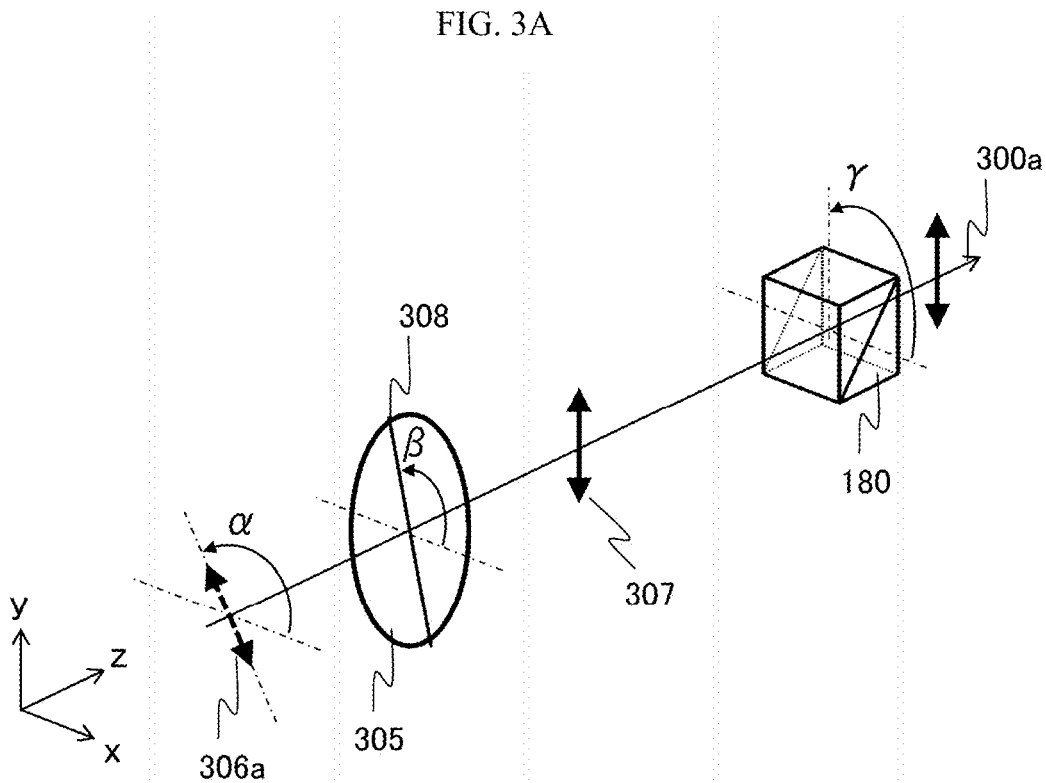

Hereinafter, examples in embodiments of the invention are described with reference to the drawings. FIG. 1 is a schematic diagram showing an example of a shape measurement system 10 according to a first embodiment. The shape measurement system 10 according to the present embodiment includes a distance measurement control mechanism 110, a connection cable 150, and a measurement probe 160.

The distance measurement control mechanism 110 will be described later in detail, and measurement light is output to the measurement probe 160. The connection cable 150 has an optical fiber and guides the measurement light to the measurement probe 160. The measurement probe 160 is a device that irradiates an object T with the measurement light from a probe tip unit 164, and guides reflected light from the object T to the distance measurement control mechanism 110.

The measurement probe 160 includes a lens system 161, a rotation mechanism 162, an optical path switching element 163, the probe tip unit 164, a polarization state control unit 165, and a polarization state control unit driving unit 166. The probe tip unit 164 is fixed to the measurement probe 160. The lens system 161 draws the measurement light output from the distance measurement control mechanism 110 and guided to the connection cable 150, and guides the drawn measurement light to the polarization state control unit 165. The rotation mechanism 162 rotates the probe tip unit 164 that locks the optical path switching element 163 around a rotation axis parallel to the measurement light output from the lens system 161 by using a driving device such as a motor under the control of a distance calculation unit 261 (FIG. 10) to be described below.

The optical path switching element 163 selectively emits light using the measurement light controlled by the polarization state control unit 165. The optical path switching element 163 has a function of switching an optical path, and emits the light toward at least one of a first direction 300a which is a traveling direction same as a traveling direction of the measurement light output from the lens system 161 and a second direction 300b substantially orthogonal to the first direction 300a. The optical path switching element 163 selectively emits the light according to, for example, a change in the polarization direction. The optical path switching element 163 is, for example, a polarization beam splitter.

The probe tip unit 164 locks the optical path switching element 163 and passes the light emitted from the optical path switching element 163 therethrough. The probe tip unit 164 has, for example, a cylindrical shape having an opening in a lower part (first direction 300a) shown in FIG. 1, and is formed by a material transmitting light, and locks the optical path switching element 163 on at least a part of an inner wall thereof. The probe tip unit 164 rotates around the rotation axis parallel to the measurement light output from the lens system 161, and the optical path switching element 163 is rotated along with the rotation of the probe tip unit 164.

The configuration of the probe tip unit 164 is not limited thereto. For example, the probe tip unit 164 may lock the optical path switching element 163 with one or a plurality of columns, and the optical path switching element 163 may be rotated along with driving of the column. In addition, the probe tip unit 164 may be formed of, for example, a transparent two-layer cylinder, and may lock the optical path switching element 163 with an inner cylinder to rotate the optical path switching element 163.

The polarization state control unit 165 controls the polarization of the measurement light output from the distance measurement control mechanism 110 under the control of the distance calculation unit 261. The polarization state control unit 165 changes the polarization direction of the measurement light, for example. The polarization state control unit driving unit 166 drives the polarization state control unit 165 in order to change the polarization of the measurement light by the polarization state control unit 165. The polarization state control unit 165 and the polarization state control unit driving unit 166 will be described below.

The measurement light output from the distance measurement control mechanism 110 reaches the polarization state control unit 165 via the connection cable 150 and the lens system 161, and the polarization state control unit 165 controls the polarization thereof. The measurement light controlled by the polarization state control unit 165 reaches the optical path switching element 163.

The light emitted from the optical path switching element 163 to the first direction 300a reaches the object T through the opening of the probe tip unit 164. The light reflected or scattered by the object T travels back along a traveling path of the emitted light in the order of the optical path switching element 163, the polarization state control unit 165, the lens system 161, and the connection cable 150, and reaches the distance measurement control mechanism 110. The distance measurement control mechanism 110 converts the reached measurement light into an electrical signal and transmits the electrical signal to the distance calculation unit 261 (not shown). The distance calculation unit 261 calculates a distance to the object T.

As shown in FIG. 1, when the object T has a cylindrical shape, a bottom depth of the cylindrical shape can be measured by using the measurement light emitted to the first direction 300a.

In addition, the light emitted from the optical path switching element 163 to the second direction 300b rotates according to the rotation of the optical path switching element 163, passes through the opening or the wall surface of a side surface of the probe tip unit 164, and is emitted onto the object T. The light reflected or scattered by the object T travels back along the traveling path of the emitted light similarly to the light emitted to the first direction 300a and reaches the distance measurement control mechanism 110 by, and the distance to the object T is calculated. The shape of the side surface of the cylindrical shape can be measured by using the measurement light emitted to the second direction 300b, for example.

FIGS. 2A-2D show diagrams illustrating the operation of the optical path switching element 163. FIGS. 2A and 2B show examples in which a polarization beam splitter 180 is used for the optical path switching element 163. FIG. 2A shows a state where the measurement light is polarized in a left-right direction of the figure, and FIG. 2B shows a state where the measurement light is polarized in a depth direction of the figure (direction on a back side and a front side in the figure).

As shown in FIG. 2A, when the measurement light is incident in a state of being polarized in the left-right direction of the figure, the incident measurement light passes through a prism of the polarization beam splitter 180, and travels in the first direction 300a same as the incident measurement light. The light reflected by the object T travels back along the same path and reaches the distance measurement control mechanism 110.

As shown in FIG. 2B, when the measurement light is incident on the polarization beam splitter 180 in a state of being polarized in the depth direction of the figure, the incident measurement light is reflected by the prism and travels in the second direction 300b substantially orthogonal to the measurement light. Similar to the light traveling in the first direction 300a, the light reflected by the object T travels back along the same path and reaches the distance measurement control mechanism 110.

By using the property, when the polarization state control unit 165 controls the polarization to maintain a predetermined angle with respect to the optical path switching element 163, the traveling direction of the measurement light can be maintained in the first direction 300a or the second direction 300b. That is, by controlling the polarization of the measurement light by the polarization state control unit 165, the traveling direction of the measurement light can be switched to the first direction 300a or the second direction 300b.

For example, a half-wave plate is used as the polarization state control unit 165. When a polarization direction of linearly polarized light incident on the half-wave plate is α and a direction of a main axis of the half-wave plate is β, the polarization direction of the emitted light is 2β−α.

When a reflection direction of the optical path switching element 163 rotated by the rotation mechanism 162 is γ, the polarization state control unit 165 is controlled so as to maintain γ=2β−α (that is, β=(γ+α)/2), so that the measurement with the light traveling in the first direction 300a can be performed. Further, the polarization state control unit 165 is controlled so as to maintain γ=2β−α+π/2 (that is, β=(γ+α)/2−π/4), so that the measurement with the light traveling in the second direction 300b can be performed.

Here, the control over the traveling direction of the measurement light will be described and supplemented.

Figure 3B:
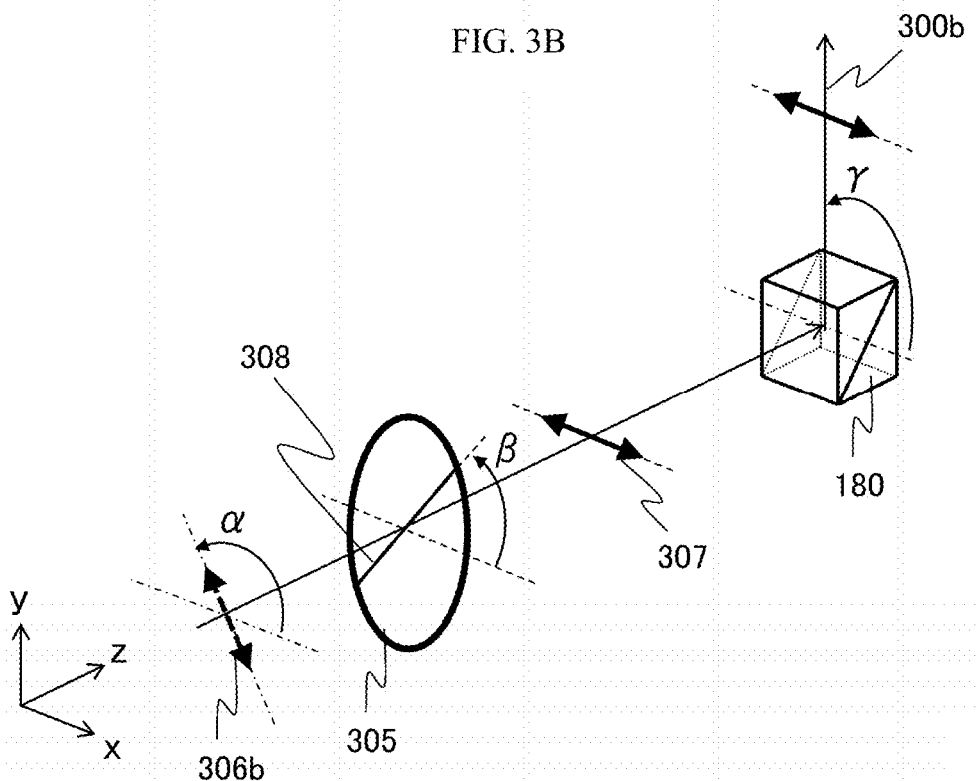

FIGS. 3A-3B are diagrams illustrating a relationship between absolute angles of respective optical elements in the first embodiment. For example, a half-wave plate 305 is used as the polarization state control unit 165, and the polarization beam splitter 180 is used as the optical path switching element 163. When an angle of a vibration direction of the linearly polarized light incident on the half-wave plate 305 is α and the direction of the main axis of the half-wave plate 305 is β, the angle of the vibration direction of the emitted linearly polarized light is 2β−α. The angles α and β, and an angle γ, which will be described later, are absolute rotation angles based on a coordinate axis x orthogonal to the first direction 300*a* (parallel to a coordinate axis z).

An angle in the direction in which the polarization beam splitter 180 rotates by the rotation mechanism 162 reflects the light is γ. Here, γ can be expressed as γ=ωt+γ$_0$ by using an angular velocity ω, a time t, and an initial angle γ$_0$. At this time, by controlling the half-wave plate 305 so as to maintain γ=2β−α (that is, β=(γ+α)/2), the measurement with the light traveling in the first direction 300*a* can be performed (FIG. 3A). Further, by controlling the half-wave plate 305 so as to maintain γ=2β−α+π/2 (that is, β=(γ+α)/2−π/4), the measurement with the light traveling in the second direction 300*b* can be performed (FIG. 3B).

Figure 4A:
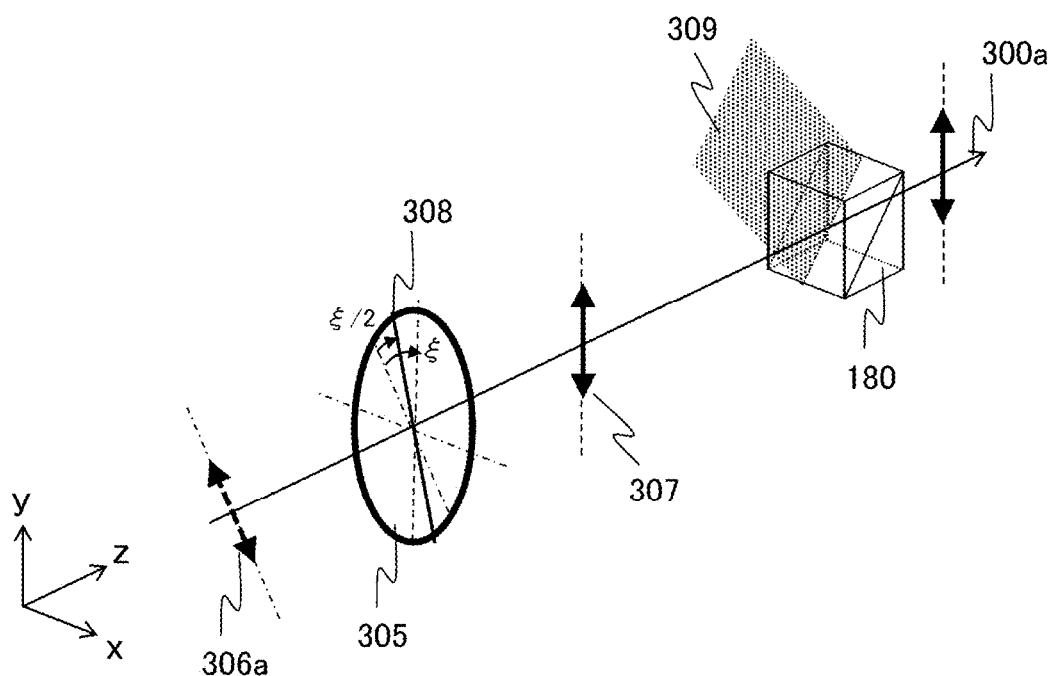
Figure 4B:
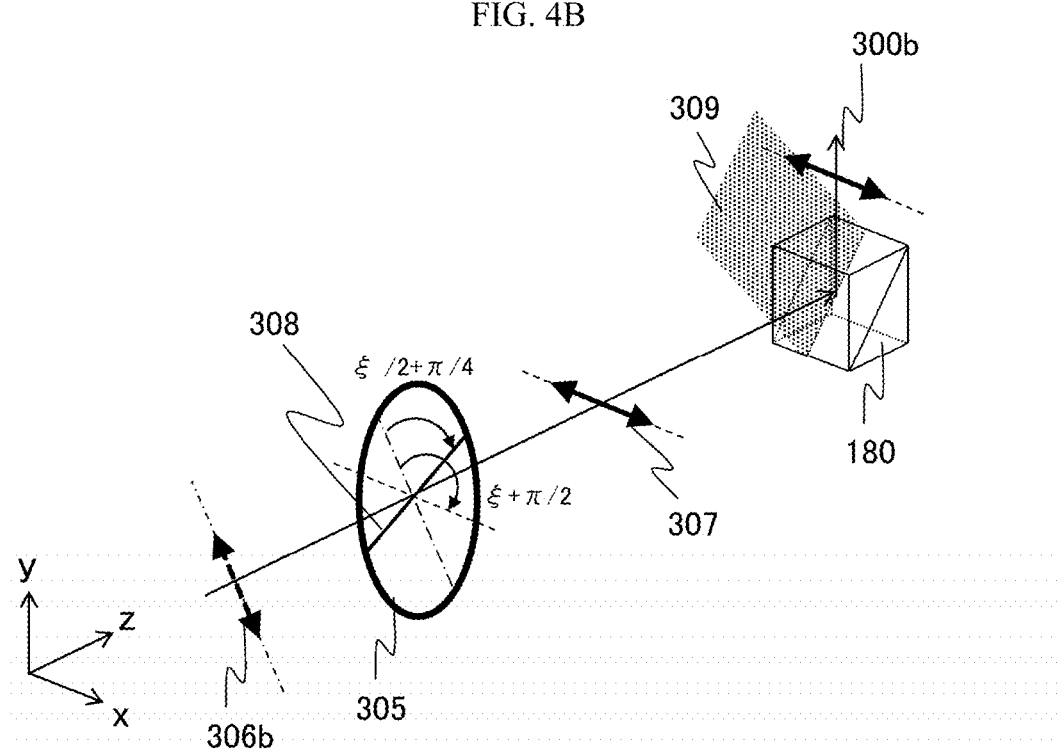

Next, FIGS. 4A and 4B show diagrams illustrating a relationship between relative angles of respective optical elements in the first embodiment. Here, the relationship between the vibration direction angle of the measurement light, the angle of the main axis of the half-wave plate, and the relative angle of the optical path switching element 163 will be described. For example, the half-wave plate 305 is used as the polarization state control unit 165, and the polarization beam splitter 180 is used as the optical path switching element 163. The polarization beam splitter 180 transmits linearly polarized light having a vibration direction parallel to an incident surface 309 (that is, emits in the direction of the first direction 300*a*), and reflects the linearly polarized light having a vibration direction of π/2 with respect to the incident surface 309 (that is, emits in the direction of the second direction 300*b*). The half-wave plate 305 inclines and emits the vibration direction of the linearly polarized light by twice an angle that the vibration direction of the incident linearly polarized light forms with respect to the main axis of the half-wave plate 305.

Here, a case is considered in which the incident surface 309 has an inclination of a relative angle ξ with respect to a first measurement light vibration direction 306*a* incident on the half-wave plate 305.

As shown in FIG. 4A, when the measurement light is emitted in the first direction 300*a*, the half-wave plate 305 is controlled so that a main axis 308 of the half-wave plate 305 maintains an angle of ξ/2 with respect to the first measurement light vibration direction 306*a* incident on the half-wave plate 305, so that a measurement light vibration direction 307 emitted from the half-wave plate 305 is maintained parallel to the incident surface 309.

In addition, as shown in FIG. 4B, when the measurement light is emitted in the second direction 300*b*, the half-wave plate 305 is controlled so that the main axis 308 of the half-wave plate 305 maintains an angle of ξ/2+π/4 with respect to the first measurement light vibration direction 306*a* incident on the half-wave plate 305, so that the measurement light vibration direction 307 emitted from the half-wave plate 305 is maintained at an angle of π/2 with respect to the incident surface 309.

As described above, the control of the polarization state control unit 165 can be achieved by rotating the half-wave plate 305 with the polarization state control unit driving unit 166.

The description will now return to FIGS. 2A-2D. As another example, a liquid crystal element can be used in the polarization state control unit 165. By controlling a voltage applied to the liquid crystal element and controlling optical rotation of the liquid crystal element by the polarization state control unit driving unit 166, the polarization state control unit 165 can change the polarization direction of the output measurement light.

As another example, the polarization direction of the measurement light may be controlled by emitting measurement light having a polarization component of random polarization or circular polarization from the lens system 161, using a polarization plate as the polarization state control unit 165, and rotating the polarization plate with the polarization state control unit driving unit 166. In this case, when the direction of the main axis of the polarization plate is β, the direction of the polarization plate is controlled so that β=γ or β=γ−π/2 with respect to γ in the reflection direction of the optical path switching element 163. Accordingly, the direction of the light emitted from the optical path switching element 163 can be switched to the first direction 300*a* or the second direction 300*b*.

As another example, a fiber type polarization control element can be used as the polarization state control unit 165. When torsion or compression is applied to the optical fiber by the polarization state control unit driving unit 166, the polarization direction of the measurement light output from the polarization state control unit 165 can be controlled by inducing birefringence.

FIGS. 2C and 2D show examples in which a combination of a birefringent plate 181 and a mirror 182 is used for the optical path switching element 163. FIG. 2C shows a state where the measurement light is polarized in the depth direction of the figure, and FIG. 2D shows a state where the measurement light is polarized in the left-right direction of the figure.

The birefringent plate 181 has a property of shifting the optical path according to the polarization state of the measurement light. For example, as shown in FIGS. 2C and 2D, the birefringent plate 181 is provided so that the measurement light polarized in the depth direction of the figure travels straightly and the optical path of the measurement light polarized in the left-right direction of the figure is shifted. Further, by disposing the mirror 182 on the optical path shifted by the birefringent plate 181, the emission direction of the shifted measurement light is changed.

Accordingly, the light can be selectively emitted to either the first direction 300*a* having an optical axis same as the measurement light emitted from the lens system 161 or the second direction 300*b* having an optical axis different from that of the first direction 300*a*, as in the case shown in FIG. 2A or 2B. In the cases shown in FIGS. 2A and 2B and in the cases shown in FIGS. 2C and 2D where the birefringent plate is used for the optical path switching element 163, the polarization direction and the light emission direction are opposite to each other.

According to the present embodiment, since the measurement light can be emitted in directions different from the optical path switching element 163, the probe tip unit 164 can be miniaturized. For example, compared to a case where the mirror is provided at the probe tip unit 164 and the mirror is driven to change the emission direction of the measurement light, a space for driving the mirror is not required in the probe tip unit 164, and a unit to be used for measurement can be efficiently formed.

Next, FIG. 5 is a diagram showing an example of the configuration of the distance measurement control mechanism 110 according to the first embodiment. The distance measurement control mechanism 110 in FIG. 5 measures the distance to the object T by using a Frequency Modulated Continuous Waves (FMCW) or Swept-Source Optical Coherence Tomography (SS-OCT) (or wavelength swept OCT). Although the FMCW is mainly used for long distance measurement using a light source having a long coherence length, and the SS-OCT is mainly used for measurement of a fine structure using a light source having a short coherence length, the basic principle is common.

The distance measurement control mechanism 110 of FIG. 5 is connected to a control device 210 and a display device 220 in addition to the measurement probe 160 described above. The control device 210 includes the distance calculation unit 261 that calculates the distance to the object T by using information received from the distance measurement control mechanism 110. The display device 220 outputs a measurement result. The distance calculation unit 261 may include the distance measurement control mechanism 110. The control device 210 may be directly communicably connected to the measurement probe 160.

The distance measurement control mechanism 110 includes a laser light source 101, an oscillator 102, optical fiber couplers 103, 104, 106 and 114, an optical fiber 105, light receivers 107 and 109, a circulator 108, a reference mirror 112, optical switches 113a and 113b, and a distance measurement control mechanism control unit 111.

The distance measurement control mechanism control unit 111 sends a sweep waveform signal to the oscillator 102. The oscillator 102 injects a triangular wave current into the laser light source 101 and modulates a driving current. As a result, the laser light source 101 generates Frequency Modulated (FM) light whose frequency is swept temporally at a constant modulation speed.

The laser light source 101 may be constituted as a semiconductor laser device with an external resonator, and a resonance wavelength of the laser light source 101 may be changed by a triangular wave control signal from the oscillator 102. As a result, the FM light whose frequency is swept temporally is generated from the laser light source 101.

The generated FM light is divided by the optical fiber coupler 103. The optical fiber coupler 103, 104, 114 may be a beam splitter. One of the divided light is guided to a reference optical system and further divided by the optical fiber coupler 104.

The divided light is provided with a certain optical path difference by the optical fiber 105, and then combined by the optical fiber coupler 106, and the combined light is received by the light receiver 107. This is a configuration of a Mach-Zehnder interferometer, and a constant beat signal proportional to the optical path difference is generated in the light receiver 107.

Other light divided by the optical fiber coupler 103 passes through the circulator 108 and is branched by the optical fiber coupler 114, one of which is reflected by the reference mirror 112 and becomes reference light, and the other of which is emitted from the measurement probe 160 to the object T. The distance measurement control mechanism 110 shown in FIGS. 3A and 3B include the optical switches 113a and 113b, which will be described below.

The light reflected by the object T returns to the distance measurement control mechanism 110 via the connection cable 150. The returned measurement light passes through the optical switches 113a and 113b, and merges with the reference light reflected by the reference mirror 112 by the optical fiber coupler 114, and the merged light is guided to the light receiver 109 by the circulator 108. A beat signal generated by interference between the reference light and the measurement light is detected.

The distance measurement control mechanism control unit 111 performs A/D conversion on a measurement beat signal received by the light receiver 109 using a reference beat signal received by the light receiver 107 as a sampling clock. Alternatively, the reference beat signal and the measurement beat signal are sampled with a constant sampling clock.

More specifically, the reference beat signal can produce a signal with a phase shifted by 90 degrees by performing Hilbert transformation. Since a local phase of the signal can be obtained from the reference signal before and after the Hilbert transformation, a timing at which the reference signal becomes a constant phase can be obtained by interpolating the phase.

By interpolating the measurement beat signal according to the timing, it is possible to resample the measurement signal with the reference signal as a reference. Alternatively, the same effect can also be achieved when the A/D conversion is performed by sampling the measurement signal with the reference beat signal as a sampling clock using an AD/DA converter included in the distance measurement control mechanism control unit 111.

Regarding the analysis of the beat signal, although there is a difference $\Delta t$ in an arrival time of the measurement light and the reference light to the light receiver 109, since the frequency of the light source has changed during this time, a beat signal with a beat frequency fb equal to a frequency difference due to the change is detected. Assuming that a frequency sweep width is $\Delta v$ and the time required to modulate the frequency by $\Delta v$ is T, the following Formula (1) is obtained.

$$\Delta t = \frac{T}{2\Delta v} f_b \qquad \text{[Formula 1]}$$

Since a distance L to the measurement target is half the distance traveled by the light during $\Delta t$, the light velocity c in the atmosphere can be used to calculate the distance L as in the following Formula (2).

$$L = \frac{cT}{2\Delta v} f_b \qquad \text{[Formula 2]}$$

The measurement signal obtained in the distance measurement control mechanism control unit 111 is subjected to First Fourier Transform (FFT), and a peak position and a size are obtained, which correspond to a reflection position and a reflected light amount of the object T respectively. In an OCT device, since it is desired to visualize a scattering position of a semitransparent body such as a living body and a magnitude of the scattering, an amplitude spectrum of the FFT can be used as it is. In the present embodiment, in order to accurately obtain the position of the surface of the object T, distance detection resolution is increased by performing interpolation as shown in FIG. 6.

FIG. 6 is a diagram showing an example of a method of obtaining a reflection position on an object surface based on a reflection intensity profile. When the horizontal axis of the figure is the FFT frequency axis and the vertical axis is the reflection intensity, the vicinity of the peak is discrete data as shown in this figure. An interval between points, that is, the distance resolution is $c/2\Delta v$. Since $\Delta v=17.8$ THz with respect to a general wavelength of 1300 nm and a sweep width of 100 nm for SS-OCT, the distance resolution $c/2\Delta v$=8.4 μm.

Since $\Delta v$=267 GHz with respect to a general wavelength of 1500 nm and a sweep width of 2 nm for FMCW, the distance resolution $c/2\Delta v$=0.56 mm. On the other hand, as shown in FIG. 6, when applying a function such as a quadratic function or a Gaussian function using three or more points near the vertex and using a peak of the applied function, the resolution can be increased by about 1/10.

The description returns to FIG. 5. Here, the optical switches 113*a* and 113*b* will be described. In order to obtain a beat signal due to the interference between the reference light and the measurement light, the difference between the optical path length from the optical fiber coupler 114 to the reference mirror 112 and the optical path length from the optical fiber coupler 114 to the object T needs to be less than or equal to a coherence distance of the laser light source 101. In order to prevent the above situation, the optical switch 113*a* and the optical switch 113*b* are simultaneously switched according to the distance from the optical fiber coupler 114 to the object T to change the length of the optical fiber between the switches.

When the difference between the optical path length from the optical fiber coupler 114 to the reference mirror 112 and the optical path length from the optical fiber coupler 114 to the object T is too long, that is, when the coherence distance is long, the beat frequency becomes too high and cannot be detected by the light receiver 109. Therefore, the optical switch 113*a* and the optical switch 113*b* are simultaneously switched such that the beat frequency becomes a frequency detectable by the light receiver 109, and the length of the optical fiber between the switches is changed.

Although the number of optical fibers to be switched is two in FIG. 5, three or more optical fibers may be installed depending on a range the measurement object, and the lengths may be switched. A switching timing may be constant or may be changed according to a situation such as the distance from the optical path switching element 163 of the object T. For example, the optical switch 113*a* and the optical switch 113*b* may be switched every rotation in synchronization with the rotation of the optical path switching element 163.

Although an optical fiber is used for the optical path, the optical path length may be changed by changing the light to a free space using an optical fiber collimator or the like and switching the light with a mirror or moving the mirror.

Further, the optical switches 113*a* and 113*b* may be provided in the optical path between the optical fiber coupler 114 and the reference mirror 112 used for branching, and the length of the optical fiber between the optical switches 113*a* and 113*b* may be similarly switched. Switching of the optical switches 113*a* and 113*b* is controlled by the distance measurement control mechanism control unit 111.

In FIG. 5, the optical path from the optical fiber coupler 114 to the optical switch 113*b* is provided in the distance measurement control mechanism 110. However, the optical path may be provided in the measurement probe 160 instead of the distance measurement control mechanism 110.

The shape measurement method performed using the distance measurement control mechanism 110 is not limited to the above example. For example, a method of measuring the time until a pulse or burst is received by irradiating the object T with a pulse or burst-like light, such as the Time Of Flight (TOF) method, or a method of measuring the phase of the received signal by irradiating the object T with continuously modulated light, such as a phase shift method or an optical comb distance measurement method, may be used. Further, the distance may be measured by measuring the defocus, or a white confocal method, an astigmatism method, a knife-edge method, and a coscopic holography method may be used.

Next, FIG. 7 is a diagram showing another example of the configuration of the distance measurement control mechanism 110 according to the first embodiment. The distance measurement control mechanism 110 in FIG. 7 is a configuration example using Spectral Domain-Optical Coherence Tomography (SD-OCT) (or frequency domain OCT) as a principle of distance measurement. The distance measurement control mechanism 110 includes the circulator 108, the optical fiber coupler 114, the reference mirror 112, the distance measurement control mechanism control unit 111, a broadband light source 115, and a spectroscope 116.

The measurement light generated by the broadband light source 115 reaches the circulator 108 via the optical fiber. The measurement light derived from the circulator 108 is divided by the optical fiber coupler 114, and a part of the divided measurement light is emitted onto the object T via the measurement probe 160. A part of the divided measurement light is reflected by the reference mirror 112 as the reference light. The measurement light reflected by the object T returns to the distance measurement control mechanism 110 via the measurement probe 160, and merges the reflected light reflected by the reference mirror 112 by the optical fiber coupler 114, and the merged light is detected by the spectroscope 116 via the circulator 108.

The spectrum of the detected light shows a vibration having a frequency proportional to the difference in optical path length between the object T and the reference mirror 112, where the horizontal axis represents the wave number of light and the vertical axis represents intensity. Therefore, the distance measurement control mechanism control unit 111 in FIG. 7 performs distance measurement by analyzing the frequency.

Further, another example of the configuration of the distance measurement control mechanism 110 will be described. The distance measurement control mechanism 110 can adopt a configuration in which a white confocal method is used for distance measurement. In this case, the distance measurement control mechanism 110 does not include the reference mirror 112 and the optical fiber coupler 114 shown in FIG. 7, and instead is constituted such that chromatic aberration is intentionally generated in the lens system 161. The measurement probe 160 having a different focal position depending on the wavelength of the measurement light is used.

In this case, when the light reflected or scattered by the object T is condensed again by the lens system 161 and returns to the distance measurement control mechanism 110, only the wavelength at which the focal point matches at the distance from the object T is captured. That is, when the light is detected by the spectroscope 116 and a wavelength at which the spectrum is a peak is calculated by the distance measurement control mechanism control unit 111, the distance measurement of the object T can be realized. According to the present configuration example, it is possible to obtain the detected spectrum data itself as the data shown in FIG. 6 without performing the FFT.

Next, FIG. 8 is a schematic diagram showing an example of a shape measurement system 20. The shape measurement system 20 in the present embodiment measures a three-dimensional shape of the object T using the function of the shape measurement system 10. The shape measurement system 20 includes a moving mechanism. The moving mechanism includes an xz-axis moving mechanism 251 and a y-axis moving mechanism 252. The measurement probe 160 is provided in the xz-axis moving mechanism 251. In the xz-axis moving mechanism 251 shown in FIG. 8, the shape measurement system 10 including the measurement probe 160 is provided.

The xz-axis moving mechanism 251 moves in the x-axis direction (left-right direction of the figure) and the z-axis direction (upper-lower direction in the figure). The xz-axis moving mechanism 251 supports the measurement probe 160, and the probe tip unit 164 moves along with the movement of the xz-axis moving mechanism 251. The y-axis moving mechanism 252 is a gate-shaped structure and moves in the y-axis direction (the depth direction of the figure). The y-axis moving mechanism 252 supports the xz-axis moving mechanism 251, and the probe tip unit 164 instructed by the xz-axis moving mechanism 251 moves along with the movement of the y-axis moving mechanism 252.

The configuration of the moving mechanism is not limited thereto, and any method may be used as long as the probe tip unit 164 is moved in tri-axial directions. For example, the probe tip unit 164 may be moved in the tri-axial directions by providing only the measurement probe 160 in the xz-axis moving mechanism 251 without providing the distance measurement control mechanism 110 in the xz-axis moving mechanism 251.

Although the shape measurement system 20 according to the present embodiment has a general axial configuration used in a three-dimensional measurement instrument, by providing the measurement probe 160 of the shape measurement system 10 of the present embodiment instead of the probe of the three-dimensional measurement instrument, highly functional non-contact type shape measurement can be realized.

In a general tri-axial processing machine, the z-axis is often provided on a tool side, and the x-axis and y-axis are often provided on the object T side, and the configuration is different from the configuration of the shape measurement system 20 shown in FIG. 8. However, by providing the measurement probe 160 in the present embodiment in the tri-axial processing machine, it is possible to realize on-machine measurement on a processing machine.

Further, the measurement probe 160 of the present embodiment is provided in a multi-degree-of-freedom robot, and the probe tip unit 164 is moved, so that the shape measurement system 20 that enables measurement with higher degree of freedom can be constituted.

Next, FIG. 9 is a schematic diagram showing another example of the shape measurement system 20. Differences from the shape measurement system 20 shown in FIG. 8 will be described. A moving mechanism of the shape measurement system 20 shown in FIG. 9 includes a rotation mechanism 256 in addition to the xz-axis moving mechanism 251 and the y-axis moving mechanism 252. The rotation mechanism 256 is locked by a rotation shaft 253 supported by a structure 254 and rotates around the rotation shaft 253. In addition, the rotation mechanism 256 rotates around a rotation shaft extending in the z-axis direction of FIG. 9, which is a rotation shaft (not shown) orthogonal to the rotation shaft 253.

A sample stage 255 is provided on the rotation mechanism 256, and the sample stage 255 rotates along with the rotation of the rotation mechanism 256. Accordingly, the object T placed on the sample stage 255 moves. With this configuration, a posture of the object T in two degrees of freedom can be controlled.

That is, the shape measurement system 20 of FIG. 9 can not only control three degrees of freedom of the relative position between the measurement probe 160 and the object T by using the xz-axis moving mechanism 251 and the y-axis moving mechanism 252, but also control two degrees of freedom of the relative position using the rotation mechanism 256, and a total of five degrees of freedom can be controlled. Accordingly, every portion of the object T can be measured from all directions.

By providing the measurement probe 160 in a general 5-axis processing machine, on-machine measurement on a processing machine can be realized. In other words, the shape measurement system 20 according to the present embodiment is not limited to the configuration shown in FIGS. 8 and 9 since the number of degrees of freedom and configuration are different depending on the processing machine. For example, instead of the measurement probe 160, the sample stage 255 may be moved in the x-axis, the y-axis, and the z-axis.

FIG. 10 is a diagram showing an example of a functional block of the shape measurement system 20. The shape measurement system 20 includes a calculation unit 260, the distance measurement control mechanism 110, the measurement probe 160, a display unit 280, and a moving mechanism 250. The distance measurement control mechanism 110 and the measurement probe 160 are the same as those in the above example. The calculation unit 260 integrally controls the entire three-dimensional shape measurement processing by using a calculation device such as a Central Processing Unit (CPU) (not shown). The display unit 280 is a device that outputs a measurement result, and has a function same as that od the display device 220 described above.

The calculation unit 260 includes the distance calculation unit 261, a shape calculation unit 262, and a moving mechanism control unit 263. The distance calculation unit 261 analyzes the measurement beat signal and the reference beat signal received by the distance measurement control mechanism 110, and converts the signals into distances. In addition, the distance calculation unit 261 controls the measurement probe 160 to control the rotation angle of the probe tip unit 164 and the polarization state of the polarization synchronized with the rotation.

The shape calculation unit 262 measures the shape of the object T by using data notified by the distance calculation unit 261. The data notified by the distance calculation unit 261 includes data of a detection direction of the measurement light. Information measured by the shape calculation unit 262 is output via the display unit 280.

The moving mechanism control unit 263 controls the moving mechanism 250 to control the relative position between the measurement probe 160 and the object T. The position or the posture of the object T controlled by the moving mechanism control unit 263 is notified to the distance calculation unit 261. The calculation unit 260 may be provided in the distance measurement control mechanism 110 or the measurement probe 160.

Second Embodiment

Next, a shape measurement system 30 according to a second embodiment will be described.

FIG. 11 is a schematic diagram showing an example of the shape measurement system 30 according to the second embodiment. Differences from the first embodiment will be described below. The shape measurement system 30 according to the present embodiment is different from the shape measurement system 10 in the first embodiment in that the polarization state control unit driving unit 166 and the polarization state control unit 165 are not provided. The shape measurement system 30 in the present embodiment switches the emission direction of the measurement light by using a wavelength instead of the polarization state of the measurement light.

The measurement light emitted from the distance measurement control mechanism 110 is introduced into the optical path switching element 163 via the lens system 161.

FIGS. 12A and 12B show diagrams illustrating the operation of the optical path switching element 163 according to the second embodiment. FIGS. 12A and 12B show an example in which a dichroic mirror 183 is used for the optical path switching element 163. The dichroic mirror 183 may be a dichroic prism.

The dichroic mirror 183 and the dichroic prism reflect light having a wavelength longer than a boundary having a certain wavelength and transmit light having a wavelength shorter than the boundary having a certain wavelength. Alternatively, light having a wavelength shorter than the boundary is reflected, and light having a wavelength longer than the boundary is transmitted. FIG. 12A shows a state where the measurement light is transmitted. The measurement light travels in the first direction 300a. FIG. 12B shows a state where the measurement light is reflected. The measurement light travels in the second direction 300b substantially orthogonal to the measurement light. That is, the measurement light can be emitted in different directions by using the dichroic mirror 183 for the optical path switching element 163.

As in the first embodiment, the optical path switching element 163 in the present embodiment captures the light reflected on the object T, and guides the light to the distance measurement control mechanism 110 by traveling the light back along the emission path.

Next, FIG. 13 is a diagram showing an example of the configuration of the distance measurement control mechanism 110 according to the second embodiment. The distance measurement control mechanism 110 of FIG. 13 includes laser light sources 101a and 101b, oscillators 102a and 102b, and an optical fiber switcher 191 in addition to the optical fiber couplers 103, 104, 106 and 114, the optical fiber 105, the optical receivers 107 and 109, the circulator 108, the reference mirror 112, the optical switches 113a and 113b, and the distance measurement control mechanism control unit 111.

The laser light source 101a and the laser light source 101b have different wavelengths. The oscillator 102a oscillates the laser light source 101a, and the oscillator 102b oscillates the laser light source 101b. The laser light source 101a and the laser light source 101b may be oscillated by one oscillator 102.

The light emitted from the oscillator 102a and the oscillator 102b is selectively controlled by the optical fiber switcher 191. The optical fiber switcher 191 is controlled by the distance measurement control mechanism control unit 111. Instead of the optical fiber switcher 191, an element that merges light of different wavelengths into one optical fiber may be used. For example, a so-called Wavelength Division Multiplexing (WDM) coupler can be used. In this case, the wavelength of the measurement light can be selected by causing the distance measurement control mechanism control unit 111 to select the light from the laser light source 101a or the light from the laser light source 101b.

By using the distance measurement control mechanism 110 of FIG. 13, light having different wavelengths can be selectively incident on the optical path switching element 163. As a result, the measurement light is selectively emitted from the optical path switching element 163 to the first direction 300a or the second direction 300b.

Next, FIG. 14 is a diagram showing another example of the configuration of the distance measurement control mechanism 110 according to the second embodiment. The distance measurement control mechanism 110 of FIG. 14 includes two OCT/FMCW light generation and detection units 171a and 171b. The OCT/FMCW light generation and detection units 171a and 171b each include the laser light source 101, the oscillator 102, the optical fiber couplers 103, 104, and 106, the optical fiber 105, the light receivers 107 and 109, and the circulator 108. A laser diode of the OCT/FMCW light generation and detection unit 171a and a laser diode of the OCT/FMCW light generation and detection unit 171b have different wavelength bands.

The distance measurement control mechanism 110 in FIG. 14 includes a WDM coupler 192. The WDM coupler 192 merges light emitted from the OCT/FMCW light generation and detection unit 171a and light emitted from the OCT/FMCW light generation and detection unit 171b, and the merged light is incident on the optical fiber coupler 114.

With the configuration, the measurement light of two types of wavelength bands is simultaneously generated. As a result, the measurement light is simultaneously emitted from the optical path switching element 163 to the first direction 300a and the second direction 300b. The measurement beat signal and the reference beat signal of the reflected light are detected by the optical receiver 107 and the light receiver 109 of each of the OCT/FMCW light generation and detection unit 171a and the OCT/FMCW light generation and detection unit 171b, and two sets of signals are processed in parallel by the distance measurement control mechanism control unit 111. Accordingly, the distance measurement in the first direction 300a and the second direction 300b can be performed in parallel.

As described above, in the first and second embodiments, the measurement light is output from the optical path switching element 163 in two different directions depending on the combination of the properties of the measurement light and the optical path switching element 163. Accordingly, it is possible to reduce the size of the configuration used for measurement without requiring a configuration for moving the mirror at the probe tip unit 164.

Third Embodiment

Next, a shape measurement system 40 according to a third embodiment will be described.

FIG. 15 is a schematic diagram showing an example of the shape measurement system 40 according to the third embodiment. Differences from the first embodiment will be described below. The shape measurement system 40 includes a polarization stabilization device 301 and a linearly polarized light switching switch 302 at a subsequent stage of the distance measurement control mechanism 110. In the present embodiment, a half-wave plate is used as the polarization state control unit 165.

The polarization stabilization device 301 has a function of stabilizing and outputting the input measurement light in a polarization state to linearly polarized light that vibrates in a certain direction. The linearly polarized light switching switch 302 has a function of rotating the direction of the linearly polarized light of the input measurement light by $\pi/2$ by applying a voltage to a built-in liquid crystal element and outputting the measurement light. The polarization stabilization device 301 and the linearly polarized light switching switch 302 are used to output linearly polarized light having a desired vibration direction, and the outputting can also be realized by a combination of a general polarization state analyzer and polarization state generator.

Here, when an angle of the vibration direction of the linearly polarized light incident on the half-wave plate is a in a case where a voltage is not applied to the linearly polarized light switching switch 302 (OFF), an angle of the vibration direction of the linearly polarized light emitted is $\alpha+\pi/2$ in a case where a voltage is applied to the linearly polarized light switching switch 302 (ON). The angle $\alpha$ and angles $\beta$ and $\gamma$ described below are absolute rotation angles based on the coordinate axis x orthogonal to the first direction 300a (parallel to the coordinate axis z).

Here, the angle in the direction in which the optical path switching element 163 rotated by the rotation mechanism 162 reflects the light is $\gamma$, and the direction of the main axis of the half-wave plate is R. At this time, by controlling the half-wave plate so as to maintain $\gamma=2\beta-\alpha$ (that is, $\beta=(\gamma+\alpha)/2$) without applying the voltage to the linearly polarized light switching switch 302, the measurement with the light traveling in the first direction 300a can be performed. Further, by applying the voltage to the linearly polarized light switching switch 302 and controlling the half-wave plate so as to maintain the angle $\gamma=2\beta-+$, the measurement with the light traveling in the second direction 300b can be performed.

Figure 16A:
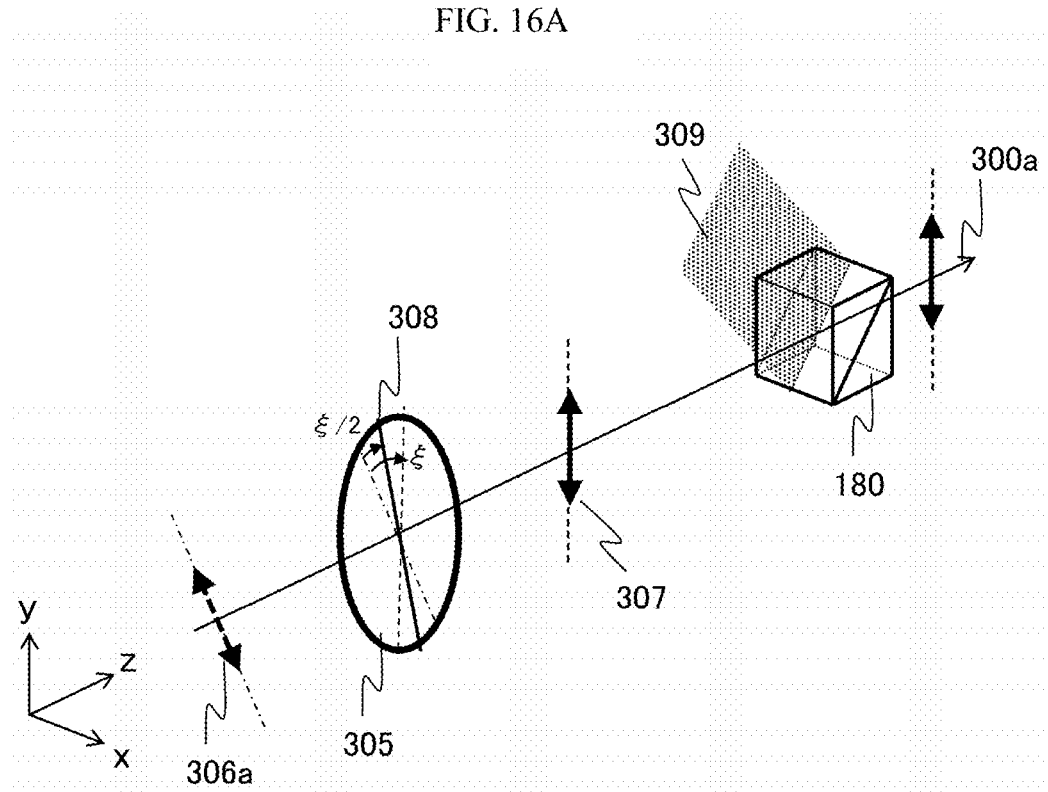
Figure 16B:
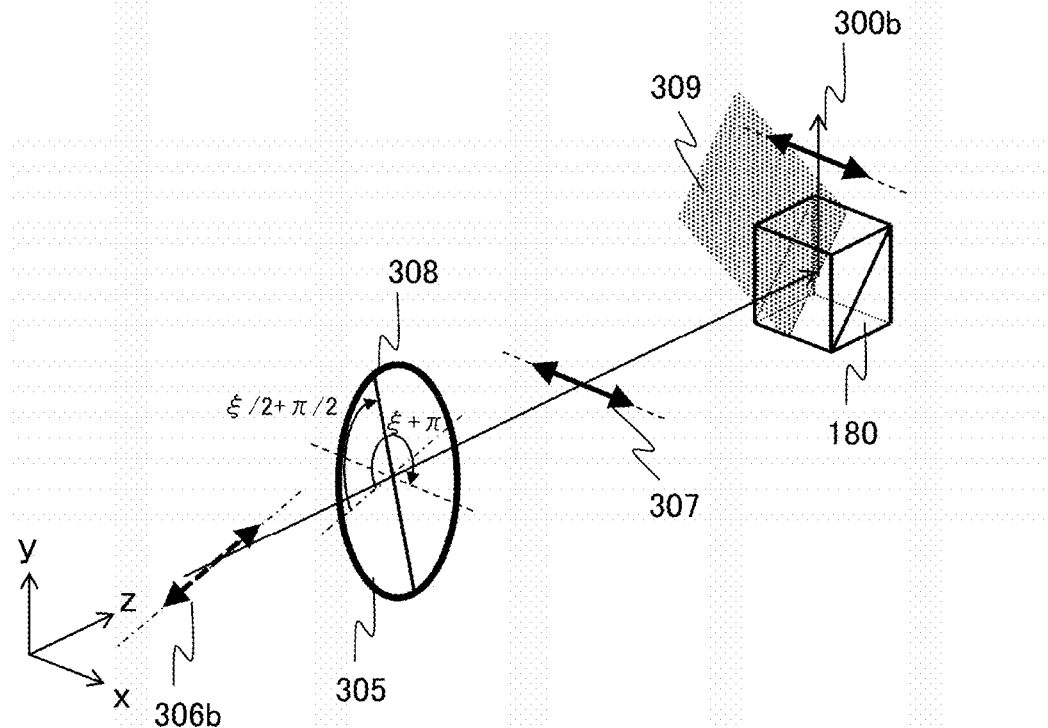

FIGS. 16A and 16B show diagrams illustrating a relationship between relative angles of the optical elements in the third embodiment.

Here, the relationship between the vibration direction angle of the measurement light, the angle of the main axis of the half-wave plate, and the relative angle of the optical path switching element 163 will be described. For example, the half-wave plate 305 is used as the polarization state control unit 165, and the polarization beam splitter 180 is used as the optical path switching element 163. The polarization beam splitter 180 transmits linearly polarized light having a vibration direction parallel to the incident surface 309 (that is, emits the linearly polarized light in the direction of the first direction 300a), and reflects linearly polarized light having a vibration direction of $\pi/2$ with respect to the incident surface 309 (that is, emits the linearly polarized light in the direction of the second direction 300b). The half-wave plate 305 inclines and emits the vibration direction of the linearly polarized light by twice an angle that the vibration direction of the incident linearly polarized light forms with the main axis of the half-wave plate 305.

Here, a case is considered in which the incident surface 309 has an inclination of a relative angle with respect to the first measurement light vibration direction 306a incident on the half-wave plate 305.

As shown in FIG. 16A, when the measurement light is emitted to the first direction 300a, first, the linearly polarized light switching switch 302 is turned off to switch the measurement light vibration direction incident on the half-wave plate 305 to the first measurement optical vibration direction 306a. At this time, the half-wave plate 305 is controlled such that the angle of the main axis 308 of the half-wave plate 305 is maintained at an angle of $\xi/2$ with respect to the first measurement light vibration direction 306a incident on the half-wave plate 305, thereby maintaining the measurement light vibration direction 307 emitted from the half-wave plate 305 parallel to the incident surface 309.

As shown in FIG. 16B, when the measurement light is emitted in the second direction 300b, first, the linearly polarized light switching switch 302 is turned on to switch the measurement light vibration direction incident on the half-wave plate 305 from the first measurement light vibration direction 306a to the second measurement light vibration direction 306b. At this time, by controlling the angle of the main axis 308 of the half-wave plate 305 to be the same angle as in FIG. 4A (that is, the angle of the main axis 308 of the half-wave plate 305 with respect to the second measurement optical vibration direction 306b is $\xi/2+\pi 2$), the measurement light vibration direction 307 emitted from the half-wave plate 305 is maintained at an angle of $\pi/2$ with respect to the incident surface 309.

That is, according to the third embodiment, since the angle of the main axis 308 of the half-wave plate 305 is constant regardless of the measurement direction, it is possible to simplify the control of the polarization state control unit driving unit 166. Further, by changing the measurement direction by electrical control over the linearly polarized light switching switch 302 without mechanical operation of the polarization state control unit driving unit 166, it is possible to switch the measurement direction at a high speed. Accordingly, a significant reduction in the measurement time is realized.

In the first embodiment, a general servo motor can be used as the polarization state control unit driving unit 166 to change the measurement direction from the first direction 300a to the second direction 300b. For example, when a servo motor having a rotation speed of 500 rpm is used, a measurement direction switching time of at least about 100 milliseconds is required to rotate the servo motor by $-\pi/4$.

On contrast, since the switching speed in the measurement direction of the general linearly polarized light switching switch 302 is about 0.1 milliseconds or less, high speed measurement direction switching can be performed by the configuration shown in the third embodiment.

Next, FIG. 17 is a diagram showing an example of a functional block of the shape measurement system 40 according to the third embodiment. Differences from the first embodiment will be described below. The shape measurement system 40 includes a polarization switching unit 310 in addition to the functional block of the shape measurement system 20 (FIG. 10).

The polarization switching unit 310 is a device that maintains the measurement light in a polarization state into linearly polarized light and switches the polarization state depending on the measurement direction, and sends the switched linearly polarized light to the measurement probe 160. The polarization switching unit 310 corresponds to the polarization stabilization device 301 and the linearly polarized light switching switch 302. The polarization switching unit 310 (linearly polarized light switching switch 302) may switch the measurement direction by manual operation of a user, or may switch the measurement direction under the control of the distance calculation unit 261.

Fourth Embodiment

Figure 18A:
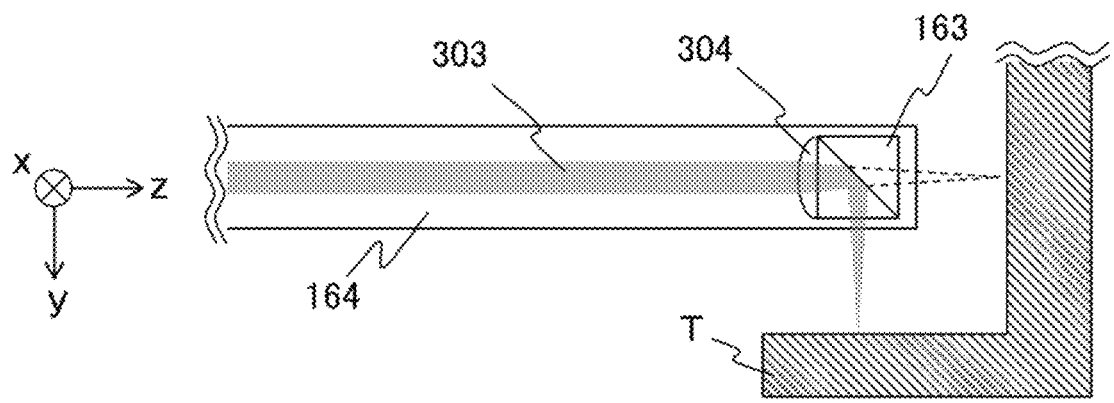
Figure 18B:
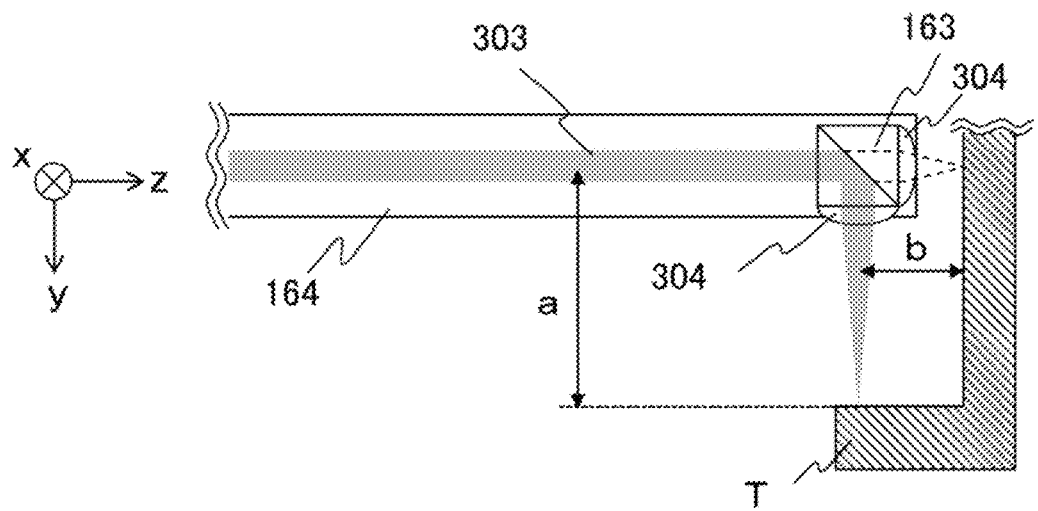

Next, FIGS. 18A and 18B show diagrams showing examples of the configuration of the probe tip unit 164 according to a fourth embodiment. The probe tip unit 164 includes one or two condensing lens systems 304 in addition to the optical path switching element 163.

Measurement light 303 shaped in a condensing state by the lens system 161 is condensed by the condensing lens system 304 positioned in front of or behind the optical path switching element 163. For example, when the measurement light 303 is shaped into parallel light by the lens system 161, a condensing position of the measurement light 303 is determined by the condensing lens system 304.

In the example of FIG. 18A, the condensing lens system 304 is disposed between the polarization state control unit 165 and the optical path switching element 163. In this case, the measurement light in either of the first direction 300a and the second direction 300b is condensed at the same focal distance. In comparison with FIG. 18B, which will be described below, since only one condensing lens system 304 is used, manufacturing is simple and the probe tip unit 164 can be reduced in diameter.

In the example of FIG. 18B, the condensing lens systems 304 are disposed between the optical path switching element 163 and the measurement target T in different measurement directions (first direction 300a and second direction 300b). In this case, the condensing lens systems 304 may be constituted such that the measurement light in either direction of the first direction 300a and the second direction 300b is condensed at the same focal distance, or the condensing lens systems 304 may be constituted so as to be focused at different focal distances. For example, when the distances a and b to the object T in the measurement directions are greatly different, the focal distance can be selected according to each distance.

A plurality of probe tip units 164 having different focal distances may be prepared, and the probe tip unit 164 may be detachable and replaceable with respect to the measurement probe 160. For example, by replacing the probe tip unit 164 according to the shape of the object T, specifically, the depth or diameter of the hole, the inclination angle of the wall surface, or the like, the condensing position of the measurement light 303 can be adjusted to accommodate the distance to the measurement target T.

In the first to third embodiments described above, the focus position of the measurement light can be adjusted according to the measurement distance from the object T by providing the lens system 161 with a variable focus mechanism such as an electric focus variable lens. On contrast, in the fourth embodiment, it is not necessary to provide the lens system 161 with the variable focus mechanism by making the probe tip unit 164 detachable and replaceable.

A plurality of probe tip units 164 having different lengths in the z-axis direction may be prepared, and the probe tip unit 164 may be detachable and replaceable with respect to the measurement probe 160. For example, by replacing the probe tip unit 164 according to the depth of the hole of the object T, it is possible to adjust the measurement light to reach the measurement target T reliably.

Further, a plurality of probe tip units 164 having the same specification may be prepared, and the probe tip unit 164 may be detachable and replaceable with respect to the measurement probe 160. In this way, when the probe tip unit 164 is damaged, it is possible to replace only the probe tip unit 164 instead of repairing the entire measurement probe 160.

Furthermore, by providing a structure in which a relative position relationship between the optical path switching element 163 and the polarization state control unit 165 can be restricted at a joint portion between the probe tip unit 164 and the measurement probe 160, the adjustment during replacement can be simplified.

Thus, in the present embodiment, the change in the length of the probe tip unit 164 and the change of the focal distance in each measurement direction can be easily selected, so that measurement according to the application for the user, that is, the shape of the object T can be assisted.

Hereinafter, a plurality of examples of the probe tip unit 164 detachably and replaceably fixed to the measurement probe 160 will be described.

<First Configuration Example of Detachable and Replaceable Probe Tip Unit 164>

FIG. 19 shows a probe tip unit 1641 as a first configuration example of the probe tip unit 164 that is detachable and replaceable with respect to the measurement probe 160.

The probe tip unit 1641 includes a condensing lens 501 and a mirror 502.

In the probe tip unit 1641, the measurement light 303 is condensed on the mirror 502 by the condensing lens 501, and is reflected in the direction of the object T by the mirror 502. Then, the reflected light reflected by the object T is reflected by the same path, that is, is reflected by the mirror 502, and then returned to the measurement probe 160 side (−z direction) via the condensing lens 501.

FIG. 20 shows a detailed configuration example of the probe tip unit 1641. The probe tip unit 1641 is fixed by mounting an optical element locking unit 515 from the lower side of the figure to a cylindrical unit 511 which has a space therein and serves as a path of the measurement light 303. The optical element locking unit 515 is formed in a cylindrical shape, and may include a return portion having a diameter larger than that of the cylindrical unit 511 at a bottom portion thereof. The optical element locking unit 515 locks optical elements such as the condensing lens 501 and the mirror 502. It is desirable that the optical element to be locked by the optical element locking unit 515 is disposed symmetrically with respect to a rotation axis of the probe tip unit 1641. Further, the optical element to be locked by the optical element locking unit 515 may not have a cylindrical shape. The side wall of the optical element locking unit 515 has an opening for passing the measurement light incident on the optical element and emitting the same.

An information tag 514 is provided on the measurement probe 160 side of the cylindrical unit 511. The information tag 514 indicates at least model number information of the probe tip unit 1641, and includes a bar code, a QR code, a character string, and the like. The information tag 514 may indicate specification information of the probe tip unit 1641. Here, the specification information includes at least a substantial length H of the probe tip unit 1641 and a beam irradiation angle θ. In the case of the probe tip unit 1641, the substantial length H refers to the distance from an origin Op of the measurement probe 160 to a point where the direction of the measurement light of the mirror 502 changes (hereinafter referred to as a direction changing point). The reason why the direction of the measurement light is changed includes not only reflection but also refraction, and may include other reasons. The beam irradiation angle θ refers to an angle of the measurement light 303 emitted onto the object T starting from a line in the z direction passing through a center of the probe tip unit 1641. Details of the substantial length H and the irradiation angle θ will be described below with reference to FIGS. 22A and 22B.

An emission window 512 for passing the measurement light 303 reflected by the mirror 502 therethrough is formed in the cylindrical unit 511. A transparent material such as glass for passing the measurement light 303 therethrough may be fitted into the emission window 512.

Because of being a hollow space, the cylindrical unit 511 has a small deviation of the center of gravity, is light, and also has a small inertia moment. In addition, since the measurement light passes through the space of the cylindrical unit 511, it is possible to reduce reflection or diffusion of the measurement light due to dust or dirt from the outside.

Figure 21A:
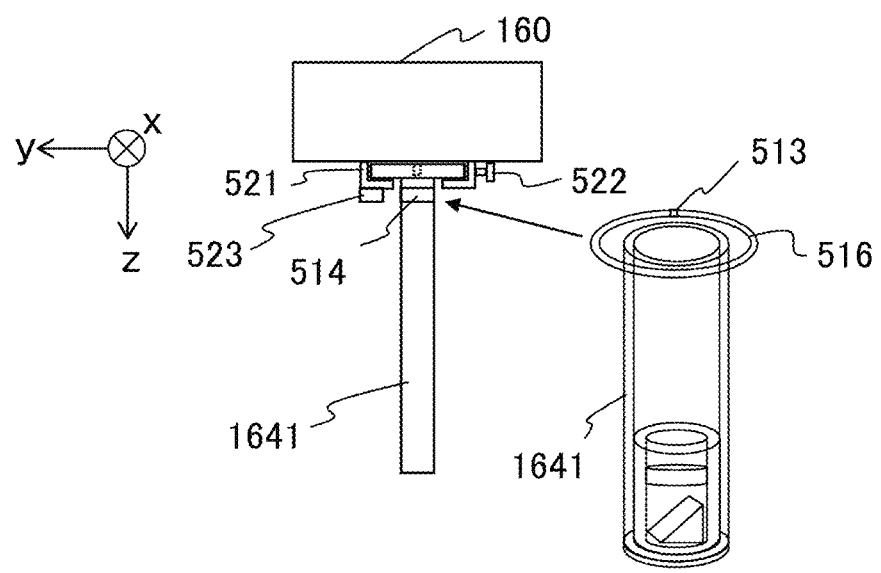
Figure 21B:
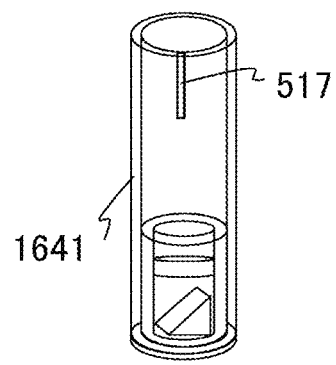

FIGS. 21A and 21B show examples of a fixing mechanism for detachably and replaceably fixing the probe tip unit 1641 to the measurement probe 160. FIG. 21A shows an example in which the probe tip unit 1641 is mounted to the measurement probe 160 from the side (x direction). In this case, a disk-shaped support plate 516 is attached to an upper end of the probe tip unit 1641. A key groove 513 for fixing an attachment angle of the probe tip unit 1641 with respect to the measurement probe 160 is formed in the support plate 516.

On the other hand, a support unit 521 for supporting the support plate 516 from below and a screw 522 for fixing the support plate 516 to the support unit 521 are provided in the measurement probe 160. A key block (not shown) corresponding to the key groove 513 is formed in the support unit 521.

The support unit 521 is provided with an information tag read unit 523 (FIGS. 21A and 21B) for reading the information tag 514 provided on the probe tip unit 1641. The information tag read unit 523 includes, for example, a camera, reads the model number information or the like from an image obtained capturing the information tag 514, and sends the model number information to the distance calculation unit 261. In the distance calculation unit 261, specification information corresponding to the received model number information is acquired from a predetermined database (not shown) and is stored, and the coordinate of the object T are calculated.

In this way, since the distance calculation unit 261 acquires the specification information of the probe tip unit 1641 based on the information tag 514 provided in the probe tip unit 1641, it is possible to prevent an error of acquiring the specification information of other probe tip unit 164. As a result, the distance or the three-dimensional shape of the object can be accurately measured.

Instead of providing the information tag read unit 523, for example, the user may capture an image of the information tag 514 using a smartphone or the like, read the model number information or the like using a smartphone or the like, and send the information tag 514 to the distance calculation unit 261. Alternatively, the user may manually input the model number information and the specification information of the probe tip unit 1641.

Further, an RFID may be adopted for the information tag 514. In this case, the information tag read unit 523 may employ an RF reader capable of reading the RFID.

FIG. 21B shows an example in which the probe tip unit 1641 is mounted to the measurement probe 160 from below (in the z direction). In this case, a concave key groove 517 for fixing the attachment angle of the probe tip unit 1641 with respect to the measurement probe 160 is formed at the upper end of the probe tip unit 1641.

Instead of the key groove 513 and the concave key groove 517, a convex key block may be formed, or a concave key groove may be formed on the measurement probe 160 side. The key groove and the key block are examples of a physical shape that uniquely determines an angle in fixing the probe tip unit 1641 (more specifically, Φ described below), and may have shapes other than those shown in the figure. Needless to say, the support unit 521 is rotated by the motor 162. The fixing mechanism may have another shape as long as the probe tip unit can be fixed to the measurement probe 160, and as a result, the probe tip unit can be rotated by the motor.

Figure 22A:
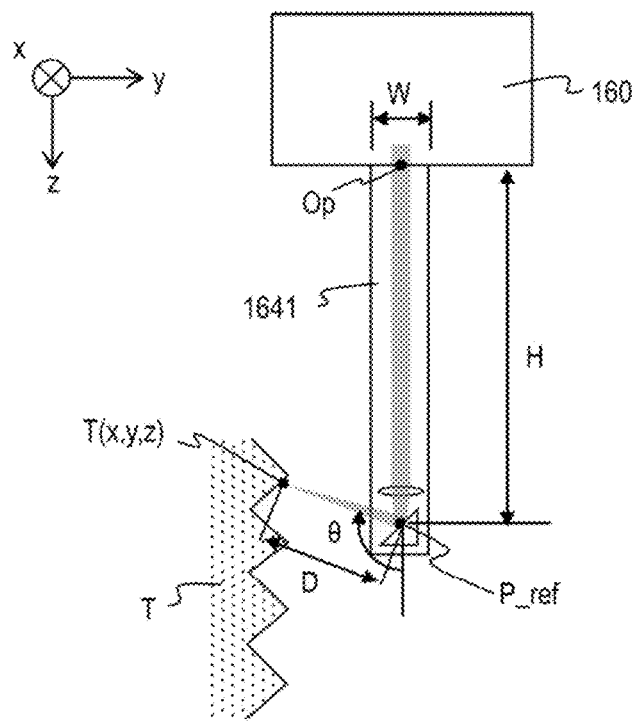
Figure 22B:
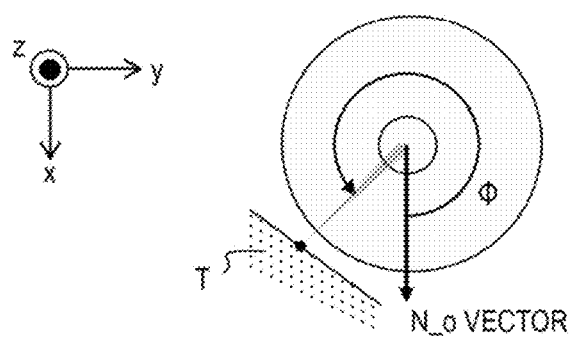

Next, FIGS. 22A and 22B show diagrams illustrating a method of calculating a coordinate (x, y, z) of the object T when the probe tip unit 1641 is adopted, which is performed by the distance calculation unit 261, and FIG. 22A shows a yz cross-sectional view, and FIG. 22B shows an xy cross-sectional view.

The coordinate (x, y, z) of the object T is represented by the following Formula (3) using the origin Op of the measurement probe 160 (in the figure, the center of the measurement probe 160 on the lower surface). In the previous and subsequent descriptions, "the origin Op of the measurement probe 160" is described in the description of the probe tip unit. This means the position of the origin Op of the measurement probe 160 at the probe tip unit "when the probe tip unit is fixed to the measurement probe 160".

$$x = D\cos(\theta-90)\sin(\varnothing-90)$$

$$y = D\cos(\theta-90)\cos(\varnothing-90)$$

$$z = H - D\sin(\theta-90) \quad \text{[Formula 3]}$$

Here, the laser irradiation angle θ and the substantial length H are acquired by the distance calculation unit 261 from a predetermined database (not shown) as the specification information corresponding to the model number information of the information tag 514. D is the distance from the probe tip unit 1641 to the object T, represented by Formula (8) described below.

In the case of being expressed as a vector, the relationship in Formula (3) is represented as Formula (4).

$$\overrightarrow{T\text{-}Op} = H \cdot \overrightarrow{P\_\text{ref-}Op} + D \cdot \overrightarrow{L\_o} \quad \text{[Formula 4]}$$

Here, a vector L_o is a unit vector representing a direction of the measurement light 303 after refraction (reflection) at a direction changing point P_ref of the mirror 502. Therefore, the vector L_o is represented by the following Formula (5).

$$\overrightarrow{L\_o} = \text{Rot}(\overrightarrow{H\_o}, (\Phi, \text{Rot}(\overrightarrow{N\_o}, \theta, \overrightarrow{H\_o}))) \quad \text{[Formula 5]}$$

Here, a vector H_o in Formula (5) is a unit vector representing a traveling direction of the measurement light 303 traveling in the z direction, and is represented by the following Formula (6).

$$\overrightarrow{H\_o} = \overrightarrow{P\_\text{ref-}Op} / |\overrightarrow{P\_\text{ref-}Op}| \quad \text{[Formula 6]}$$

In the case of the following Formula (7), $$\text{Rot}(\overrightarrow{A}, \text{Angle}, \overrightarrow{B}) \quad \text{[Formula 7]}$$

Rot ( ) in the Formula (5) means that a vector B is rotated by Angle in a right screw direction with a vector A as a rotation axis (the vector A and the vector B have start points thereof moved to the same position and rotated by Angle in the right screw direction).

D in Formula (4) is calculated by the following Formula (8).

$$D = D\_\text{raw} - H \quad \text{[Formula 8]}$$

Here, D_raw is an optical path length from the origin Op to the object T (the same as a geometric length if a refractive index in the optical path is the same as vacuum). When the object T is to be measured, the measurement probe 160 is moved in the z direction, and at each z coordinate, the probe tip unit 164 is rotated by one rotation about the z-axis to obtain the optical path length Draw. When the z coordinate of the origin Op of the measurement probe 160, the rotation angle Φ (FIG. 22B) of the probe tip unit 164, the optical path length Draw, and the polarization direction at each sampling timing are supplied to the distance calculation unit 261 from the measurement probe 160, the three-dimensional shape of the object T can be calculated by the distance calculation unit 261. Note that, Φ is an angle based on an N_o vector. The N_o vector is a reference set in the measurement probe 160. The reference may be shown on the outer surface (for example, drawing a line at the bottom) of the measurement probe 160. Alternatively, the reference may be a direction of a key groove or key block of an indication unit 521 of the fixing mechanism provided in the measurement probe 160 described in FIGS. 21A and 21B (when the measurement probe is activated or initialized).

For the z coordinate of the origin Op of the measurement probe 160, the position relationship starting from the origin Op at the start of measurement is a function f(t) with time t as an argument, the z coordinate of the measurement probe 160 may be calculated using the function f(t) and added to a vector (T-Op). The starting point of the z coordinate of the origin Op of the measurement probe 160 is not limited to the origin Op at the start of measurement, and any point can be set as the origin. For example, a predetermined point of the xz-axis moving mechanism 251 (FIG. 9) or a predetermined point of the object T may be the starting point.

As an idea of the optical path length Draw, D may be calculated with the reflection position from the optical element (such as the condensing lens 501) of the probe tip unit 1641 as the origin. In other words, a value obtained by subtracting the substantial length H from the optical path length from the reflection position (the origin in this case) from the optical element (such as the condensing lens 501) of the probe tip unit 1641 may be regarded as the optical path length Draw. In this case, even if the length of the cylindrical unit 511 changes, the influence thereof can be reduced.

Next, FIG. 23 is a flowchart illustrating a three-dimensional shape measurement processing performed by the shape measurement system 20.

The three-dimensional shape measurement processing is started, for example, according to a predetermined operation from the user with respect to the calculation unit 260 (FIG. 10).

First, in step S1, the information tag read unit 523 (FIG. 21A) captures an image of the information tag 514 provided at the probe tip unit 1641, reads the model number information and the like from the image obtained, and sends the information to the distance calculation unit 261. The distance calculation unit 261 receives the model number information of the probe tip unit 1641 sent from the information tag read unit 523.

Next, in step S2, the distance calculation unit 261 (FIG. 10) acquires and stores specification information (the substantial length H and the beam irradiation angle θ) of the probe tip unit 1641 corresponding to the received model number information by referring to the predetermined database (not shown). After the distance calculation unit 261 acquires and stores the specification information of the probe tip unit 1641 by the above steps S1 and S2, the measurement on the object T using the measurement light 303 by the distance measurement control mechanism 110 and the measurement probe 160 is started.

Next, in step S3, the distance calculation unit 261 acquires the z coordinate of the origin Op of the measurement probe 160 from the moving mechanism control unit 263 (FIG. 10).

Next, in step S4, the rotation angle Φ and the optical path length Draw of the probe tip unit 164 acquired while the measurement probe 160 makes one rotation about the z-axis which is a rotation axis, and the acquired rotation angle Φ and the optical path length Draw are outputted to the distance calculation unit 261.

Next, in step S5, the distance calculation unit 261 calculates the coordinate of the object T based on the optical path length Draw at each rotation angle Φ input from the measurement probe 160, and the substantial length H and the beam irradiation angle θ in the specification information, and notifies the shape calculation unit 262 (FIG. 10) of a calculation result together with the z coordinate of the origin Op of the measurement probe 160.

Next, in step S6, the shape calculation unit 262 measures the shape of the object T using the calculation result and the z coordinate of the origin Op of the measurement probe 160 notified from the distance calculation unit 261, and displays an output screen 700 (FIG. 34) including the three-dimensional image of the object T on the display unit 280. However, since the three-dimensional image of the object T displayed at the time is fixed at the z coordinate, there is no thickness in the z direction.

Next, the calculation unit 260 determines whether to end the three-dimensional shape measurement processing (step S7). Specifically, for example, when a predetermined operation is performed by the user or when the measurement probe 160 comes into contact with the object T, it is determined that the three-dimensional shape measurement processing is to be ended.

Here, when the calculation unit 260 determines that the three-dimensional shape measurement processing is not ended (NO in step S7), the moving mechanism control unit 263 moves (the origin Op of) the measurement probe 160 by a predetermined distance in the z direction (step S8). Thereafter, the processing returns to step S3, and steps S3 to S8 are repeated. Accordingly, the three-dimensional image of the object T displayed on the output screen 700 gradually increases in thickness in the z direction. Further, when the calculation unit 260 determines that the three-dimensional shape measurement processing is ended (YES in step S7), the three-dimensional shape measurement processing is ended.

In the three-dimensional shape measurement processing described above, although the coordinate of the object T is calculated in real time, and the three-dimensional image is displayed based on the calculation result, the coordinate of the object T may be calculated and the three-dimensional image may be displayed based on the calculation result after moving the measurement probe 160 in the z direction.

The rotation angle and optical path length acquisition with one rotation in step S4, the peripheral processing, and movement in the z direction may be performed in parallel. In addition, steps S1 and S2 may be performed not immediately before the measurement but when the probe tip unit is fixed, when the measurement probe is activated, or when the calculation unit (or a program of the calculation unit) is activated.

Although the moving direction (including relative movement) of the measurement probe by the moving mechanism control unit 263 is described on the assumption that it moves in the z direction, the moving direction is not limited to the z direction and a direction along the rotation axis of the probe tip unit may be used. From the viewpoint of reducing the elastic bending of the probe tip unit, it is preferable that the rotation axis of the probe tip unit having a substantially cylindrical shape is aligned with the direction of gravity. Alternatively, it is preferable that the position of the measurement probe 160 is fixed and the relative position of the measurement probe 160 and the object T is changed by moving the object T, since the bending of the probe tip unit due to acceleration and deceleration performed at the start and end of movement of the measurement probe can be avoided. Alternatively, even when the measurement probe 160 is moved, it is preferable that the moving direction is moved along the rotation axis of the probe tip unit. However, the relative movement of the measurement probe is not limited thereto.

<Second Configuration Example of Detachable and Replaceable Probe Tip Unit 164>

Next, FIG. 24 shows a probe tip unit 1642 as a second configuration example of the probe tip unit 164 that is detachable and replaceable with respect to the measurement probe 160.

The probe tip unit 1642 is obtained by adding a Wollaston prism 531 between the condensing lens 501 and the mirror 502 of the probe tip unit 1641 (FIG. 19).

The Wollaston prism 531 refracts the incident measurement light 303 at different angles according to the polarization direction thereof.

In the probe tip unit 1642, the measurement light 303 is condensed by the condensing lens 501 on the Wollaston prism 531, refracted at a different angle according to the polarization direction, and reflected by the mirror 502 in the direction of the object T. Then, the reflected light reflected by the object T is reflected by the same path, that is, is reflected by the mirror 502, and then returned to the measurement probe 160 side (–z direction) via the Wollaston prism 531 and the condensing lens 501.

In the case of the probe tip unit 1642, two types of beams (measurement light) having different beam irradiation angles θ can be emitted. In this case, the user can select which beam to perform the measurement at the time of measurement. The selection may be the selection of the polarization direction of the beam, or may be the selection of the beam irradiation angle θ.

Figure 25A:
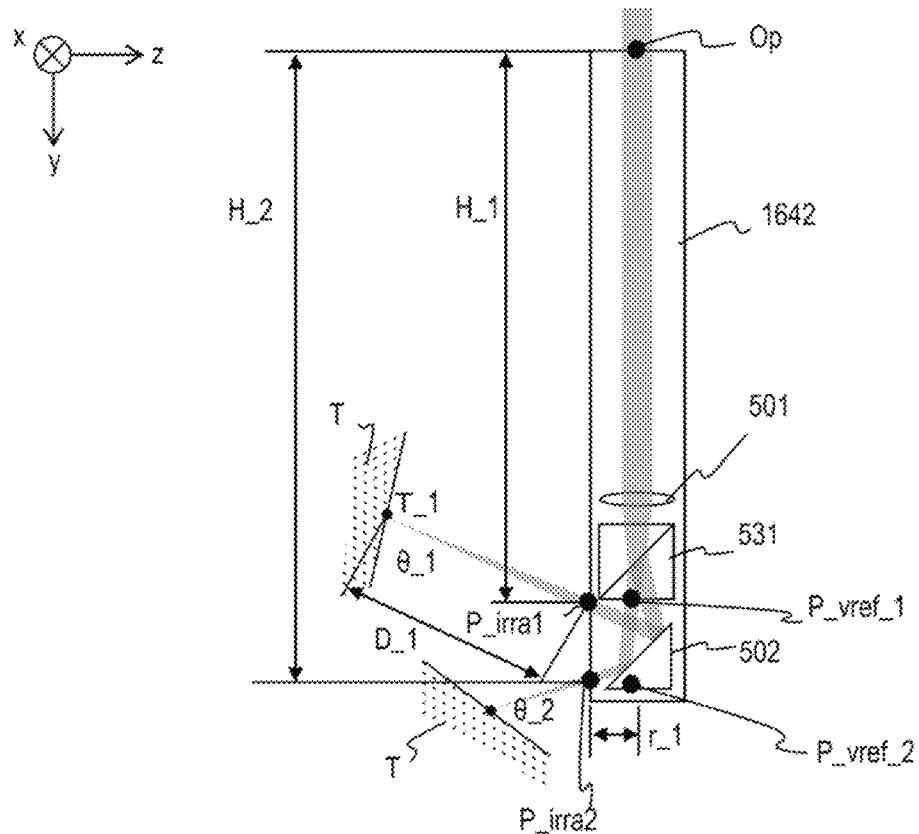
Figure 25B:
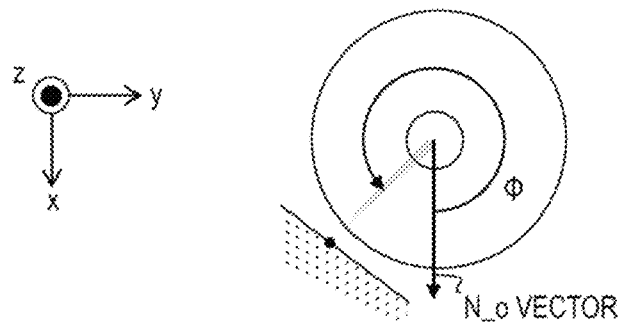

Next, FIGS. 25A and 25B show diagrams illustrating a method of calculating coordinate (x, y, z) of the object T when the probe tip unit 1642 is adopted, which is performed by the distance calculation unit 261, in which FIG. 25A shows a yz cross-sectional view, and FIG. 25B shows an xy cross-sectional view.

Specification information of the probe tip unit 1642 exists for each beam. The specification information corresponding to a first beam includes a beam irradiation angle θ_1, a substantial length H_1, and a distance r_1. The specification information corresponding to a second beam includes a beam irradiation angle θ_2, a substantial length H_2, and an angle difference Φ_diff.

Here, the substantial length H_1 is a length from the origin Op to P_irra1. In this case, the P_irra1 is a beam irradiation port. However, p_irra1 may be a laser beam passing point on the outer surface of the optical element exposed to the outside, or a point where the beam is refracted (reflected) inside the probe tip unit 1641. Further, p_irra1 may be an arbitrary point in the middle of a beam linear section in the atmosphere. The distance r_1 is a distance from the rotation axis of the measurement probe 160 to the beam irradiation port P_irra1.

The substantial length H_2 is a length from the origin Op to a beam irradiation port P_irra2. The angle difference Φ_diff is an angle difference between a rotation angle of the beam irradiation port P_irra1 and a rotation angle of the beam irradiation port P_irra2. In the case of the FIG. 25A, the angle difference Φ_diff is 0.

Hereinafter, for simplification of description, the rotation angle of the measurement probe 160 is represented by the rotation angle of the beam irradiation port P_irra1.

In a case of being expressed as a vector, the coordinate of an object T_1 measured by the first beam is represented as the following Formula (9).

$$\overrightarrow{T\_1\text{-}Op} = H\_1 \cdot \overrightarrow{P\_\text{irra}\_1\text{-}Op} + \overrightarrow{R\_1} + D\_1 \cdot \overrightarrow{L\_o1} \quad \text{[Formula 9]}$$

Here, a vector L_o1 is a unit vector representing the direction of the first beam emitted from the beam irradiation port P_irra1. Specifically, a value corresponding to the first beam may be substituted into Φ and θ of Formula (5). D_1 is the distance from the beam irradiation port P_irra1 to the object T_1. A vector R_1 is a position vector of the beam irradiation port P_irra1 starting from the rotation axis of the measurement probe 160, and is expressed by the following Formula (10).

$$\overrightarrow{R\_1} = r\_1 \cdot \text{Rot}(N\_o, \Phi\_1, \overrightarrow{H\_o}) \quad \text{[Formula 10]}$$

D_1 in Formula (9) and the measured optical path length Draw have a relationship represented by the following Formula (11).

$$D\_\text{raw} = H\_1 - FD\_1 + C\_1 \quad \text{[Formula 11]}$$

Here, C_1 is an optical path length correction value. The optical path length correction value C_1 is determined in consideration of the optical path length Draw from a virtual direction changing point P_vref1 (for example, a point where the origin Op is moved by H_1 along the rotation axis of the measurement probe 160) to the beam irradiation port P_irra1, a path length of the optical path between the virtual direction changing point P_vref1 and the origin Op (the above H_1 is calculated as a straight line, but is not actually a straight line), or the increase in the optical path length increasing according to a refractive index of the optical elements (condensing lens 501, Wollaston prism 531, or the like) even if it is a straight line.

The optical path length correction value C_1 is a value that depends on the structure of the tip unit where the optical elements are dense in the probe tip unit 164 and that does not depend on the substantial length H. The optical path length correction value C_1 can be calculated by measuring the optical path length Draw from the origin Op to the beam irradiation port P_irra1 and subtracting the substantial length H therefrom. Strictly speaking, the optical path length correction value C_1 also changes when the beam irradiation angles θ_1 and θ_2 are changed. Therefore, the optical path length correction value C_1 may be obtained by calculation, but may also be measured by the manufacturer or the like of the probe tip unit 164 in advance from the object T for which D_1 is known, and may be included in the specification information.

The coordinate of the object T_1 measured by the first beam is described above, and the coordinate of an object T_2 measured by the first beam can be obtained in the same manner.

<Third Configuration Example of Detachable and Replaceable Probe Tip Unit 164>

Next, FIG. 26 shows a probe tip unit 1643 as a third configuration example of the probe tip unit 164 that is detachable and replaceable with respect to the measurement probe 160.

The probe tip unit 1643 includes a prism 551 having a polarization beam splitting surface 5511 and a reflective coating surface 5512, a wedge prism 552, a condensing lens 553, a wedge prism 554, and a condensing lens 555.

In the probe tip unit 1643, when the measurement light 303 is polarized in the upper-lower direction of the figure, the measurement light 303 is refracted downward in the figure by the polarization beam splitting surface 5511 and is refracted by the wedge prism 552 to adjust the irradiation angle θ, and is then emitted onto the object T via the condensing lens 553. Then, the reflected light reflected by the object T is returned to the measurement probe 160 side (−z direction) via the same path.

Further, when the measurement light 303 is polarized in the depth direction of the figure, the measurement light 303 passes through the polarization beam splitting surface 5511, is refracted by the reflective coating surface 5512, and is refracted by the wedge prism 554 to adjust the irradiation angle θ, and is then emitted onto the object T via the condensing lens 555. Then, the reflected light reflected by the object T is returned to the measurement probe 160 side (−z direction) via the same path.

In the case of the probe tip unit 1643, two types of beams (measurement light) having different beam irradiation angles θ can be emitted. In this case, the user can select which beam to perform the measurement at the time of measurement. The selection may be the selection of the polarization direction of the beam, or may be the selection of the beam irradiation angle θ.

<Fourth Configuration Example of Detachable and Replaceable Probe Tip Unit 164>

Next, FIG. 27 shows a probe tip unit 1644 as a fourth configuration example of the probe tip unit 164 that is detachable and replaceable with respect to the measurement probe 160.

The probe tip unit 1644 includes a polarization beam splitter 561, a wedge prism 562, a condensing lens 563, a quarter-wave plate 564, a mirror 565, a wedge prism 566, and a condensing lens 567.

In the probe tip unit 1644, when the measurement light 303 is polarized in the upper-lower direction of the figure, the measurement light 303 is refracted downward in the figure by the polarization beam splitter 561 and is refracted by the wedge prism 562 to adjust the irradiation angle θ, and is then emitted onto the object T via the condensing lens 563. Then, the reflected light reflected by the object T is returned to the measurement probe 160 side (−z direction) via the same path.

Further, when the measurement light 303 is polarized in the depth direction of the figure, the measurement light 303 passes through the polarization beam splitter 561, is reflected by the mirror 565 via the quarter-wave plate 564, and is incident on the polarization beam splitter 561 again via the quarter-wave plate 564. The measurement light 303 that has passed through the quarter-wave plate 564 twice and is incident on the polarization beam splitter 561 has the polarization direction rotated by π/2 around the traveling direction as an axis, so that the measurement light 303 is refracted upward in the figure by the polarization beam splitter 561 and is refracted by the wedge prism 566 to adjust the irradiation angle θ, and is then emitted onto the object T via the condensing lens 567. Then, the reflected light reflected by the object T is returned to the measurement probe 160 side (−z direction) via the same path.

In the case of the probe tip unit 1644, two types of beams (measurement light) having different beam irradiation angles θ and beam rotation angles Φ can be emitted. In this case, the user can select which beam to perform the measurement at the time of measurement. The selection may be the selection of the polarization direction of the beam, or may be the selection of the beam irradiation angle θ.

<Fifth Configuration Example of Detachable and Replaceable Probe Tip Unit 164>

Next, FIG. 28 shows a probe tip unit 1645 as a fifth configuration example of the probe tip unit 164 that is detachable and replaceable with respect to the measurement probe 160.

The probe tip unit 1645 includes a condensing lens 571, a polarization beam splitter 572, and a wedge prism 573.

In the probe tip unit 1645, when the measurement light 303 is incident on the polarization beam splitter 561 via the condensing lens 571 and is polarized in the upper-lower direction of the figure, the measurement light 303 is refracted in the downward direction of the figure by the polarization beam splitter 572 and is emitted onto the object T via the wedge prism 573. Then, the reflected light reflected by the object T is returned to the measurement probe 160 side (−z direction) via the same path.

Further, when the measurement light 303 is polarized in the depth direction of the figure, the measurement light 303 passes through the polarization beam splitter 572 and is emitted onto the object T. Then, the reflected light reflected by the object T is returned to the measurement probe 160 side (−z direction) via the same path.

In the case of the probe tip unit 1645, two types of beams (measurement light) having different beam irradiation angles θ can be emitted. In this case, the user can select which beam to perform the measurement at the time of measurement. The selection may be the selection of the polarization direction of the beam, or may be the selection of the beam irradiation angle θ. In particular, the probe tip unit 1645 can measure the distance from the probe tip unit 1645 to the bottom of the object T (right side of the figure) by using the measurement light 303 passing through the polarization beam splitter 572.

<Sixth Configuration Example of Detachable and Replaceable Probe Tip Unit 164>

Next, FIG. 29 shows a probe tip unit 1646 as a sixth configuration example of the probe tip unit 164 that is detachable and replaceable with respect to the measurement probe 160.

The probe tip unit 1646 is obtained by adding a wedge prism 581 to the probe tip unit 1645 (FIG. 28).

In the probe tip unit 1646, when the measurement light 303 is incident on the polarization beam splitter 572 via the condensing lens 571 and is polarized in the upper-lower direction of the figure, the measurement light 303 is refracted in the downward direction of the figure by the polarization beam splitter 572 and is refracted by the wedge prism 573 to adjust the irradiation angle θ, and is then emitted onto the object T. Then, the reflected light reflected by the object T is returned to the measurement probe 160 side (−z direction) via the same path.

Further, when the measurement light 303 is polarized in the depth direction of the figure, the measurement light 303 passes through the polarization beam splitter 572 and is then refracted by the wedge prism 581 to adjust the irradiation angle θ, and is then emitted onto the object T. Then, the reflected light reflected by the object T is returned to the measurement probe 160 side (−z direction) via the same path.

In the case of the probe tip unit 1646, two types of beams (measurement light) having different beam irradiation angles θ can be emitted. In this case, the user can select which beam to perform the measurement at the time of measurement. The selection may be the selection of the polarization direction of the beam, or may be the selection of the beam irradiation angle θ. In particular, the probe tip unit 1646 can measure the shape of the bottom of the object T (right side of the figure) from the probe tip unit 1646 by using the measurement light 303 passing through the polarization beam splitter 572.

<Seventh Configuration Example of Detachable and Replaceable Probe Tip Unit 164>

Next, FIG. 30 shows a probe tip unit 1647 as a seventh configuration example of the probe tip unit 164 that is detachable and replaceable with respect to the measurement probe 160.

The probe tip unit 1647 includes a condensing lens 591 and a prism 592 having a polarization beam splitting surface 5921 and a reflective coating surface 5922.

In the probe tip unit 1647, the measurement light 303 is incident on the prism 592 via the condensing lens 591. When the measurement light 303 is polarized in the upper-lower direction of the figure, the measurement light 303 is refracted downward in the figure by the polarization beam splitting surface 5921 of the prism 592 and is emitted onto the object T. Then, the reflected light reflected by the object T is returned to the measurement probe 160 side (−z direction) via the same path.

Further, when the measurement light 303 is polarized in the depth direction of the figure, the measurement light 303 passes through the polarization beam splitting surface 5921 of the prism 592, is then reflected by the reflective coating surface 5922 and is emitted onto the object T. Then, the reflected light reflected by the object T is returned to the measurement probe 160 side (−z direction) via the same path.

In the case of the probe tip unit 1647, two types of beams (measurement light) having different beam irradiation angles θ can be emitted. In this case, the user can select which beam to perform the measurement at the time of measurement. The selection may be the selection of the polarization direction of the beam, or may be the selection of the beam irradiation angle θ.

<Eighth Configuration Example of Detachable and Replaceable Probe Tip Unit 164>

Next, FIG. 31 shows a probe tip unit 1648 as an eighth configuration example of the probe tip unit 164 that is detachable and replaceable with respect to the measurement probe 160.

The probe tip unit 1648 includes a prism 601 having a polarization beam splitting surface 6011 and a reflective coating surface 6012, a condensing lens 602, and a condensing lens 603.

In the probe tip unit 1648, the measurement light 303 is incident on the prism 601. When the measurement light 303 is polarized in the upper-lower direction of the figure, the measurement light 303 is refracted downward in the figure by the polarization beam splitting surface 6011 of the prism 601, and is then emitted onto the object T via the condensing lens 602. Then, the reflected light reflected by the object T is returned to the measurement probe 160 side (−z direction) via the same path.

Further, when the measurement light 303 is polarized in the depth direction of the figure, the measurement light 303 passes through the polarization beam splitting surface 6011 of the prism 601, is reflected by the reflective coating surface 6012, and is then emitted onto the object T via the condensing lens 603. Then, the reflected light reflected by the object T is returned to the measurement probe 160 side (−z direction) via the same path.

In the case of the probe tip unit 1648, two types of beams (measurement light) having different beam irradiation angles θ can be emitted. In this case, the user can select which beam to perform the measurement at the time of measurement. The selection may be the selection of the polarization direction of the beam, or may be the selection of the beam irradiation angle θ.

<Ninth Configuration Example of Detachable and Replaceable Probe Tip Unit 164>

Next, FIG. 32 shows a probe tip unit 1649 as a ninth configuration example of the probe tip unit 164 that is detachable and replaceable with respect to the measurement probe 160.

The probe tip unit 1649 includes a polarization beam splitter 611, a condensing lens 612, a quarter-wave plate 613, a mirror 614, and a condensing lens 615.

In the probe tip unit 1649, when the measurement light 303 is polarized in the upper-lower direction of the figure, the measurement light 303 is refracted downward in the figure by the polarization beam splitter 611 and is emitted onto the object T via the condensing lens 612. Then, the reflected light reflected by the object T is returned to the measurement probe 160 side (−z direction) via the same path.

Further, when the measurement light 303 is polarized in the depth direction of the figure, the measurement light 303 passes through the polarization beam splitter 611, is reflected by the mirror 614 via the quarter-wave plate 613, and then is incident on the polarization beam splitter 611 again via the quarter-wave plate 613. The measurement light 303 that has passed through the quarter-wave plate 613 twice and is incident on the polarization beam splitter 611 has the polarization direction rotated by $\pi/2$ around the traveling direction as an axis, so that the measurement light 303 is refracted upward in the figure by the polarization beam splitter 611, and is emitted onto the object T via the condensing lens 615. Then, the reflected light reflected by the object T is returned to the measurement probe 160 side (−z direction) via the same path.

In the case of the probe tip unit 1649, two types of beams (measurement light) having different beam irradiation angles θ and beam rotation angles Φ can be emitted. In this case, the user can select which beam to perform the measurement at the time of measurement. The selection may be the selection of the polarization direction of the beam, or may be the selection of the beam irradiation angle θ.

<Tenth Configuration Example of Detachable and Replaceable Probe Tip Unit 164>

Next, FIG. 33 shows a probe tip unit 16410 as a tenth configuration example of the probe tip unit 164 that is detachable and replaceable with respect to the measurement probe 160.

The probe tip unit 16410 includes a glass rod 621, a condensing lens 622, a triangular mirror 623, a wedge prism 624, and a wedge prism 625.

The glass rod 621 is disposed so as to pass approximately half of a light flux of the measurement light 303 therethrough. A refractive index of the glass rod 621 is different from the refractive index of the vacuum. Therefore, among the restraints of the measurement light 303, since the optical path length of the measurement light 303 passing through the glass rod 621 is different from that of the measurement light 303 not passing through the glass rod 621, the reflected light from the object T can be distinguished.

In the probe tip unit 16410, the light flux of the measurement light 303 not passing through the glass rod 621 is refracted downward in the figure by the triangular mirror 623 via the condensing lens 622 to adjust the irradiation angle θ by the wedge prism 624, and is then emitted onto the object T. Then, the reflected light reflected by the object T is returned to the measurement probe 160 side (−z direction) via the same path.

The light flux of the measurement light 303 passing through the glass rod 621 is refracted upward in the figure by the triangular mirror 623 via the condensing lens 622 to adjust the irradiation angle θ by the wedge prism 625, and is then emitted onto the object T. Then, the reflected light reflected by the object T is returned to the measurement probe 160 side (−z direction) via the same path.

In the case of the probe tip unit 16410, two types of beams (measurement light) having different beam irradiation angles θ can be simultaneously emitted. In this case, the user can select which beam to perform the measurement at the time of measurement. The selection may be the selection of the polarization direction of the beam, or may be the selection of the beam irradiation angle θ.

<Summary of Detachable and Replaceable Probe Tip Unit 164>

The above-described detachable and replaceable probe tip units 1641 to 16410 can be appropriately replaced depending on the shape of the object T, specifically, the depth of the hole, the diameter of the hole, the inclination of the wall surface, or the like, so that it is possible to irradiate the object T with a sufficient amount of measurement light and increase the measurable area (the area to which the measurement light can be emitted), and thus the three-dimensional shape of the object T can be measured more accurately. The measurement of the three-dimensional shape of the object means, for example, acquiring the position of the surface of the object in a three-dimensional coordinate space.

<Display Example of Output Screen 700>

Next, FIG. 34 shows a display example of the output screen 700 displayed on the display unit 280 by the three-dimensional shape measurement processing.

The output screen 700 is provided with a model number display area 701 and a measurement result display area 702. In the model number display area 701, the model number information of the probe tip unit 164 used for measurement is displayed. In the measurement result display area 702, a three-dimensional image of the object T is displayed in real time.

Although not shown, the output screen 700 may display the specification information of the probe tip unit 164. The specification information may be displayed before the three-dimensional image is displayed. When the user of the output screen 700 obtains more specific specification information, it is possible to contribute to the validity determination of the measurement result. Further, when the user obtains the specification information before measuring the object T, it is possible to contribute to the validity determination of the measurement condition.

The output screen 700 may be provided with a button for starting execution of steps S1 and S2 in the flowchart of FIG. 23 or a button for starting execution of step S3 and subsequent steps in the flowchart of FIG. 23. The output screen 700 shows an example in which a three-dimensional shape is displayed as an image, and a button for downloading coordinate information of a three-dimensional shape may be provided as an alternative or additional function.

<Use Case>

A use case of the shape measurement system described above can include, for example, the following examples.

(A) The user of the shape measurement system selects one having a suitable model number or specification according to the approximate shape of the object T from a plurality of the probe tip unit 164 having different model numbers. For example, when the hole of the object is a cylindrical through hole, a probe tip unit having a focal distance close to the radius of the cylinder and having a substantial length longer than the depth of the hole is selected, and a wide range and highly accurate measurement is aimed. For example, when the normal of the side surface is inclined from the central axis of the hole, such as a hole of the object like a screw hole, by selecting a probe having a beam irradiation angle θ suitable for the inclination of the normal of the side surface, highly accurate measurement is aimed (since as a general tendency, the measurement accuracy decreases when the angle between the normal direction and the beam irradiation angle increases).

(B) The user confirms whether the probe tip unit 164 currently fixed to the measurement probe 160 has a selected model number or specification. For the confirmation, tag information is used, or information output (for example, the output screen 700, the output of the display unit 280, or the output of the display device 220) is used. When the selected model number or specification is not included, the currently fixed probe tip unit 164 is removed and replaced with a probe tip unit having the selected model number or specification.

(C) [Option] The user sends or manually inputs the specification or model number of the fixed probe tip unit 164 to the calculation unit 260. Alternatively, the system administrator confirms whether the model number or specification of the fixed probe tip unit 164 is as selected by the above-described information output.

(D) The user instructs the calculation unit 260 to start the three-dimensional shape measurement processing (in particular, step S3 and the subsequent steps). Thereafter, the user confirms the three-dimensional shape with a video, and downloads and analyzes coordinate data of the three-dimensional shape. The above is an example of the use case.

<Modification>

In the above Formula (11), $D\_1$ is calculated using the optical path length correction value $C\_1$. However, when the $P\_irra1$ is defined on the surface of an optical element such as a lens, a polarization beam splitter, a prism, a mirror, or a glass of an emission window, $D\_1$ can be calculated without using the optical path length correction value $C\_1$.

Generally, in the case of FMCW or SS-OCT, when the beam is incident on a transparent or semi-transparent optical element whose refractive index is not 1, the beam also reflects on the incident surface, so that the optical path length of the incident surface is detected. Further, the light is incident on the inside of the optical element once, and is also reflected when being emitted from the surface on an opposite side, and the optical path length of the emission surface is also detected. Specifically, for example, in the case of the probe tip unit 1642 (FIG. 24), the optical path length on the surface of each optical element is detected, as shown in FIG. 35.

Therefore, in the distance calculation unit 261, $D\_1$ can be obtained as the difference between the optical path length of the emission $P\_irra1$ and the optical path length of the object T.

In each of the embodiments described above, in order to maintain the distance measurement accuracy, it is necessary to suppress expansion, contraction, self-weight deflection, or vibration accompanying rotation due to environmental temperature changes for the probe tip unit 164. Examples of a material of the probe tip unit 164 that satisfies the above requirements include Carbon Fiber Reinforced Plastics (CFRP) characterized by light weight, high strength, high rigidity, high vibration damping property, low thermal expansion coefficient, and the like.

The embodiments and modifications of the invention have been described above, but the invention is not limited to an example of the above embodiments, and includes various modifications. For example, the example of the above embodiments has been described in detail in order to make the invention easy to understand, and the invention is not limited to including all the configurations described herein.

Specifically, for example, the following modifications are possible.

A mechanism for the measurement probe 160 to rotate the probe tip unit 164 and a mechanism for changing the polarization direction and the wavelength may be a mechanism other than the mechanism described above.

The optical element that refracts the optical path (refers to bending the optical path) may be an element other than the mirror, the prism, and the optical path switching element described above.

The optical element for condensing light (or optical path) may be an element other than the condensing lens described above.

In the above description, although the cylindrical unit in which the optical element is locked and the fixing mechanism is provided is described as an example, the cross-section of the cylindrical unit may have a shape other than a circle such as a square.

In the above description, although the probe tip unit 164 is capable of emitting one or two discontinuous beam irradiation angles θ, the probe tip unit 164 may be capable of emitting three or more discrete beam irradiation angles θ. The embodiments may be used in combination. For example, the measurement probe 160 may be capable of using two or more types of probe tip units disclosed in FIG. 18A, FIG. 18B, FIG. 19, FIG. 24, FIG. 26, FIG. 27, FIG. 28, FIG. 29, FIG. 30, FIG. 31, FIG. 32, and FIG. 33 (for example, the fixing mechanism has a common shape at the probe tip unit in each figure). In addition, the calculation unit 260 may be capable of additionally downloading a program or setting data suitable for the probe tip unit disclosed in each figure. The additional download allows the user to use the additional released probe tip unit when the probe tip unit is released additionally after the production or the beginning use of the system.

A part of a configuration of an example in a certain embodiment can be replaced with a configuration of another example. A configuration of another example can be added to a configuration of an example of a certain embodiment. Another configuration may be added to, deleted from, or replaced with a part of a configuration of an example in each embodiment. A part or all of the configurations described above, functions, processing units, processing means, and the like may be realized by hardware, for example, through designing an integrated circuit. Control lines and information lines shown in the figures are the ones considered to be necessary for description, and all the lines are not necessarily shown. It may be considered that almost all configurations are connected to each other.

The configuration of the shape measurement system described above can also be classified into more components according to the processing contents. One component can also be classified to execute more processing.

REFERENCE SIGN LIST

10, 20, 30 shape measurement system
101, 101a, 101b laser light source
102, 102a, 102b oscillator
103, 104, 106, 114 optical fiber coupler
105 optical fiber
107, 109 receiver
108 circulator
110 distance measurement control mechanism
111 distance measurement control mechanism control unit
112 reference mirror
113a, 113b optical switch
115 broadband light source
116 spectroscope
150 connection cable
160 measurement probe
161 lens system
162, 256 rotation mechanism
163 optical path switching element
164 probe tip unit
165 polarization state control unit
166 polarization state control unit driving unit
171a, 171b OCT/FMCW light generation and detection unit
180 polarization beam splitter
181 birefringent plate
182 mirror
183 dichroic mirror
191 optical fiber switcher
192 WDM coupler
210 control device
220 display device
250 moving mechanism
260 calculation unit
261 distance calculation unit
262 shape calculation unit
263 moving mechanism control unit
251 xz-axis moving mechanism
252 y-axis moving mechanism
253 rotation shaft
254 structure
255 sample stage
280 display unit
300a first direction
300b second direction
301 polarization stabilization device
302 linearly polarized light switching switch
303 measurement light
304 condensing lens system
305 half-wave plate
306a first measurement light vibration direction incident on half-wave plate
306b second measurement light vibration direction incident on half-wave plate
307 measurement light vibration direction emitted from half-wave plate
308 main axis of half-wave plate
309 incident surface
310 polarization switching unit
501 condensing lens
502 mirror
511 cylindrical unit
512 emission window
513 key groove
514 information tag
515 optical element locking unit
516 support plate
517 key groove
521 support unit
522 screw
523 information tag read unit 531 Wollaston prism
551 prism
552 wedge prism
553 condensing lens
554 wedge prism
555 condensing lens
561 polarization beam splitter
562 wedge prism
563 condensing lens
564 quarter-wave plate
565 mirror
566 wedge prism
567 condensing lens
571 condensing lens
572 polarization beam splitter
573 wedge prism
581 condensing lens
582 polarization beam splitter
583, 584 wedge prism
591 condensing lens
592 prism
601 prism
602, 603 condensing lens
611 polarization beam splitter
612 condensing lens
613 quarter-wave plate
614 mirror
615 condensing lens
621 glass rod
622 condensing lens
623 triangular mirror
624, 625 wedge prism
700 output screen
701 model number display area
702 measurement result display area
5511 polarization beam splitting surface
5512 reflective coating surface
5921 polarization beam splitting surface
5922 reflective coating surface
6011 polarization beam splitting surface
6012 reflective coating surface
T object

What is claimed is:

1. A shape measurement system using Frequency Modulated Continuous Waves (FMCW) or Optical Coherence Tomography (OCT), comprising:
 a measurement probe; a probe tip; and a processor, wherein
 the measurement probe includes:
  a motor that rotates the probe tip; and
  a lens that irradiates an optical element to which the probe tip is locked with measurement light;
 the probe tip includes:
  the optical element that refracts or reflects the measurement light in a different direction; and
  a cylindrical unit that locks the optical element, and
 the processor is configured to:
  calculate an optical path length from the optical element to an object based on reflected light of the measurement light with which the object is irradiated; and
  calculate a three-dimensional shape of the object based on input information and the optical path length.

2. The shape measurement system according to the claim 1, wherein the length of the cylindrical unit is changeable.

3. The shape measurement system according to the claim 2, wherein a material of the cylindrical unit is carbon fiber reinforced plastics.

4. The shape measurement system according to the claim 1, wherein a beam irradiation angle is an angle of the measurement of light from a line in a direction passing through a center of the probe tip.

5. The shape measurement system according to the claim 1, wherein the processor is further configured to:
 rotate the probe tip by one rotation around the z-axis to obtain the optical path length at a plurality of predetermined times.

* * * * *